(12) United States Patent
Pham et al.

(10) Patent No.: US 12,293,090 B2
(45) Date of Patent: May 6, 2025

(54) SYSTEMS AND METHODS FOR MANAGING BIAS MODE SWITCHING

(71) Applicant: Samsung Electronics Co., Ltd., Suwon-si (KR)

(72) Inventors: Vincent Tung Pham, San Jose, CA (US); Andrew Zhenwen Chang, Los Altos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/939,949

(22) Filed: Sep. 7, 2022

(65) Prior Publication Data
US 2024/0020027 A1 Jan. 18, 2024

Related U.S. Application Data

(60) Provisional application No. 63/389,353, filed on Jul. 14, 2022.

(51) Int. Cl.
G06F 3/00 (2006.01)
G06F 3/06 (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| | | | |
|---|---|---|---|
| 8,799,582 B2 | 8/2014 | Sheaffer et al. | |
| 10,346,944 B2 | 7/2019 | Nurvitadhi et al. | |
| 10,373,285 B2 | 8/2019 | Ray et al. | |
| 10,649,956 B2 | 5/2020 | Koker et al. | |
| 11,030,126 B2 | 6/2021 | Koufaty et al. | |
| 11,036,650 B2 | 6/2021 | Agarwal | |
| 11,204,867 B2 | 12/2021 | Agarwal et al. | |
| 11,263,143 B2 | 3/2022 | Gupta et al. | |
| 2006/0080508 A1* | 4/2006 | Hoover ............... | G06F 12/0835 711/146 |
| 2016/0062893 A1* | 3/2016 | Tune ................... | G06F 12/0831 711/146 |
| 2018/0285266 A1 | 10/2018 | Koker et al. | |
| 2019/0018806 A1* | 1/2019 | Koufaty ............. | G06F 12/0806 |
| 2019/0102311 A1 | 4/2019 | Gupta et al. | |
| 2021/0011864 A1 | 1/2021 | Guim Bernat et al. | |

(Continued)

FOREIGN PATENT DOCUMENTS

EP 3985520 A1 4/2022

OTHER PUBLICATIONS

European Partial Search Report for Application No. 23185267.4, mailed Dec. 11, 2023.
(Continued)

*Primary Examiner* — Craig S Goldschmidt
(74) *Attorney, Agent, or Firm* — Renaissance IP Law Group LLP

(57) ABSTRACT

A storage device is disclosed. The storage device may include a storage for a data and a controller to manage access to the data in the storage. A mechanism may automatically manage a bias mode for a chunk of the data in the storage, the bias mode including one of a host bias mode and a device bias mode.

16 Claims, 16 Drawing Sheets

| Bias Score Table | | | | |
|---|---|---|---|---|
| Chunk ID | Score | Bias | Th. D | Th. H |
| 0x0000 | 0 | 0 | -3 | +3 |
| 0x0001 | 2 | 0 | -3 | +3 |
| 0x0002 | -3 | 1 | -3 | +3 |
| ⋮ | | | | |

(56) References Cited

U.S. PATENT DOCUMENTS

| | | |
|---|---|---|
| 2021/0089459 A1 | 3/2021 | Lu et al. |
| 2021/0311646 A1 | 10/2021 | Malladi et al. |
| 2021/0373951 A1 | 12/2021 | Malladi et al. |

OTHER PUBLICATIONS

European Extended Search Report for Application No. 23185267.4, mailed Apr. 18, 2024.

* cited by examiner

| Bias Score Table | | | | |
|---|---|---|---|---|
| Chunk ID | Score | Bias | Th. D | Th. H |
| 0x0000 | 0 | 0 | -3 | +3 |
| 0x0001 | 2 | 0 | -3 | +3 |
| 0x0002 | -3 | 1 | -3 | +3 |
| ⋮ | | | | |

SYSTEMS AND METHODS FOR MANAGING BIAS MODE SWITCHING

RELATED APPLICATION DATA

This application claims the benefit of U.S. Provisional Patent Application Ser. No. 63/389,353, filed Jul. 14, 2022, which is incorporated by reference herein for all purposes.

FIELD

The disclosure relates generally to storage devices, and more particularly to managing storage devices that support both host bias and device bias.

BACKGROUND

As storage devices support different mechanisms to access data, the requirements for such access may increase. This increase in requirements for access to data may increase relative to the amount of data stored on the storage device: as more data is stored on the storage device, the more stringent the access requirements may become.

A need remains for a way to manage access to data on a storage device.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
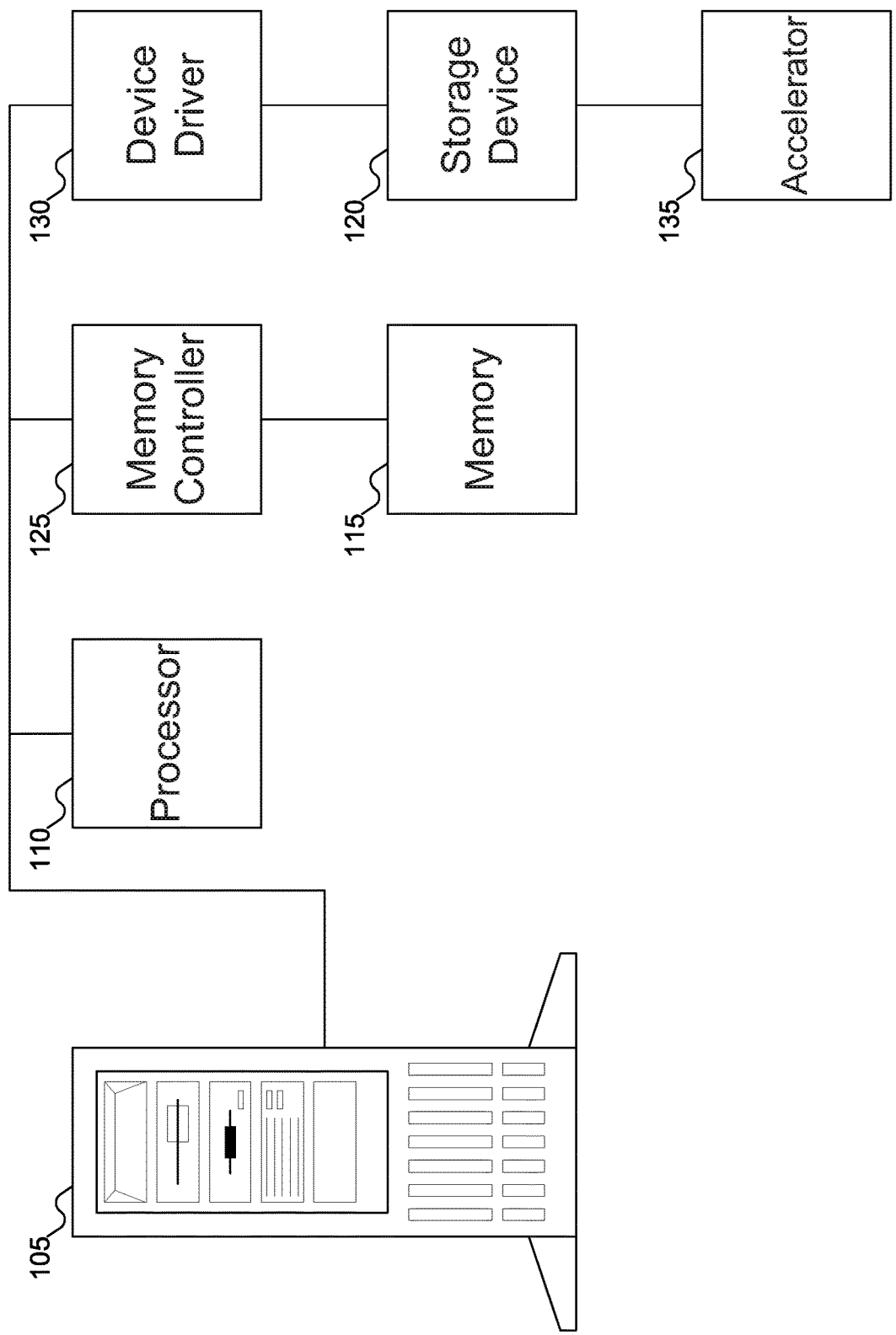
FIG. 1 shows a system including a storage device supporting bias mode management, according to embodiments of the disclosure.

Embodiments of the disclosure include a system. The system may include a storage device supporting both host bias mode and device bias mode for data on the storage device. The storage device may support bias mode management to switch data between host bias mode and device bias mode.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Some storage devices, such as storage devices supporting a cache coherent interconnect protocol like the Compute Express Link (CXL) protocol, permit multiple different sources to access data stored on the storage device. For example, the host processor may access data from the storage device, but so may an accelerator (which may be implemented within the storage device: the combination of a storage device and an accelerator may be referred to as a computational storage unit, computational storage device, computational storage, or computing storage, among other possibilities).

Some sources, such as a host processor, may include a local cache. The local cache may be used to store data retrieved from the storage device (or other places) for use by the host processor. The local cache may be relatively smaller than the storage device, but may be accessed by the host processor more rapidly than the storage device itself.

If the data on the storage device is accessed only by the host processor, the fact that the host processor might cache some of the data may be a negligible point. But if the data is also accessed by other sources, such as an accelerator, the copy of the data in the local cache may create problems. For example, if the accelerator updates the data, the copy of the data in the local cache may be stale (that is, out of date), and the host may need to retrieve a copy of the updated data to stay current. Or, if the processor updates the data in the local cache but delays committing the update to the storage device, the accelerator might access stale data from the storage device, and the accelerator might produce meaningless results.

To address these situations, standards for cache coherent interconnect protocol storage devices may specify that the storage device may operate in one of two modes: host bias or device bias. In host bias mode, it is assumed that the host may have a cached copy of the data, and any device that wants to access the data may check with the host to determine if the host processor cache includes data. In device bias mode, it is assumed that the data on the storage device is current, and the host processor may need to retrieve data from the storage device rather than relying on a cached copy (which might be stale). But the standards for cache coherent interconnect protocol devices might not specify how to switch between host bias mode and device bias mode.

Embodiments of the disclosure provide various ways to manage switching between host bias mode and device bias mode, to improve storage device performance. Using one technique, the storage device may use a locality counter to track whether a particular chunk of data is being accessed more often by the host or the device. When the counter for a particular chunk crosses an appropriate threshold, the bias mode for that chunk may be changed to reflect which source is currently accessing that chunk more frequently.

Using another technique, when a device requests that the bias on a number of chunks be sequentially flipped from host bias mode to device bias mode, the storage device may start changing chunks from host bias mode to device bias mode in the background, in anticipation of the device asking for those chunks next. This process may improve performance over waiting for all the chunks in the region to be flipped from host bias mode to device bias mode before any processing begins.

Using yet another technique, the storage device may include a snoop filter. The snoop filter may track which chunks are (or might be) currently cached by the host processor. If a chunk is evicted from the snoop filter, the storage device may request the host processor to flush the chunk from the processor cache.

FIG. 1 shows a system including a storage device supporting bias mode management, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number of storage devices in machine 105. Storage device 120 may each support any desired protocol or protocols, including, for example, the Non-Volatile Memory Express (NVMe) protocol. Different storage devices 120 may support different protocols and/or interfaces. For example, storage device 120 might support a cache coherent interconnect protocol, which may support both block-level protocol (or any other higher level of granularity) access and byte-level protocol (or any other lower level of granularity) access to data on storage device 120. An example of such a cache coherent interconnect protocol is the Compute Express Link (CXL) protocol, which supports accessing data in blocks using the CXL.io protocol and accessing data in bytes using the CXL.mem protocol. In this manner, data on a CXL storage device may be accessed as either block-level data (like an SSD) or byte-level data (such as a memory): the CXL storage device may be used to extend the system memory.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

Machine 105 may also include accelerator 135. Accelerator 135 may be a form of local processing "nearer" to storage device 120 that may be used to support processing queries on a database, which might be stored on storage device 120. By using accelerator 135, queries might be processed more quickly than by processor 110, and the load on processor 110 may be reduced.

Figure 2:
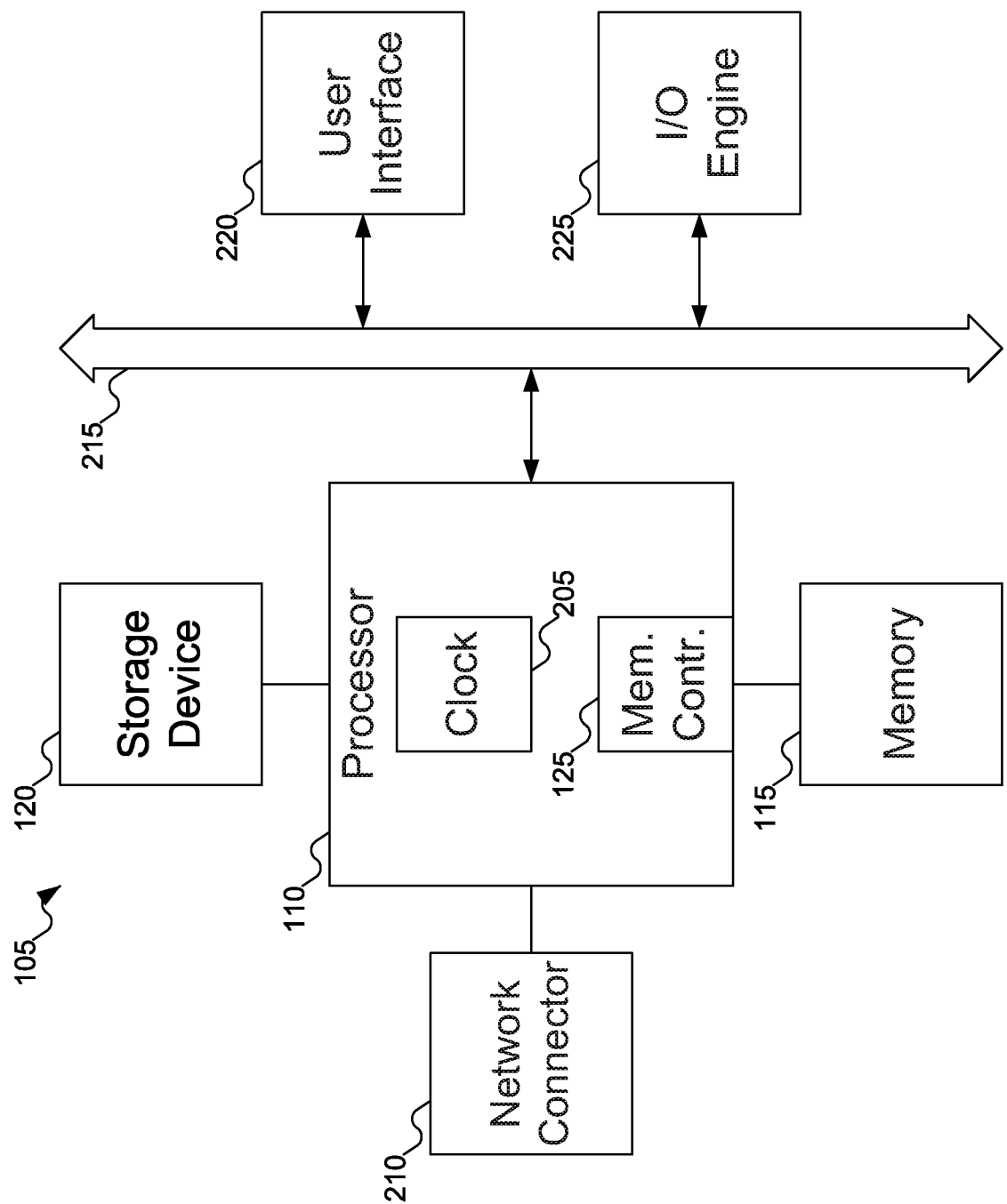
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
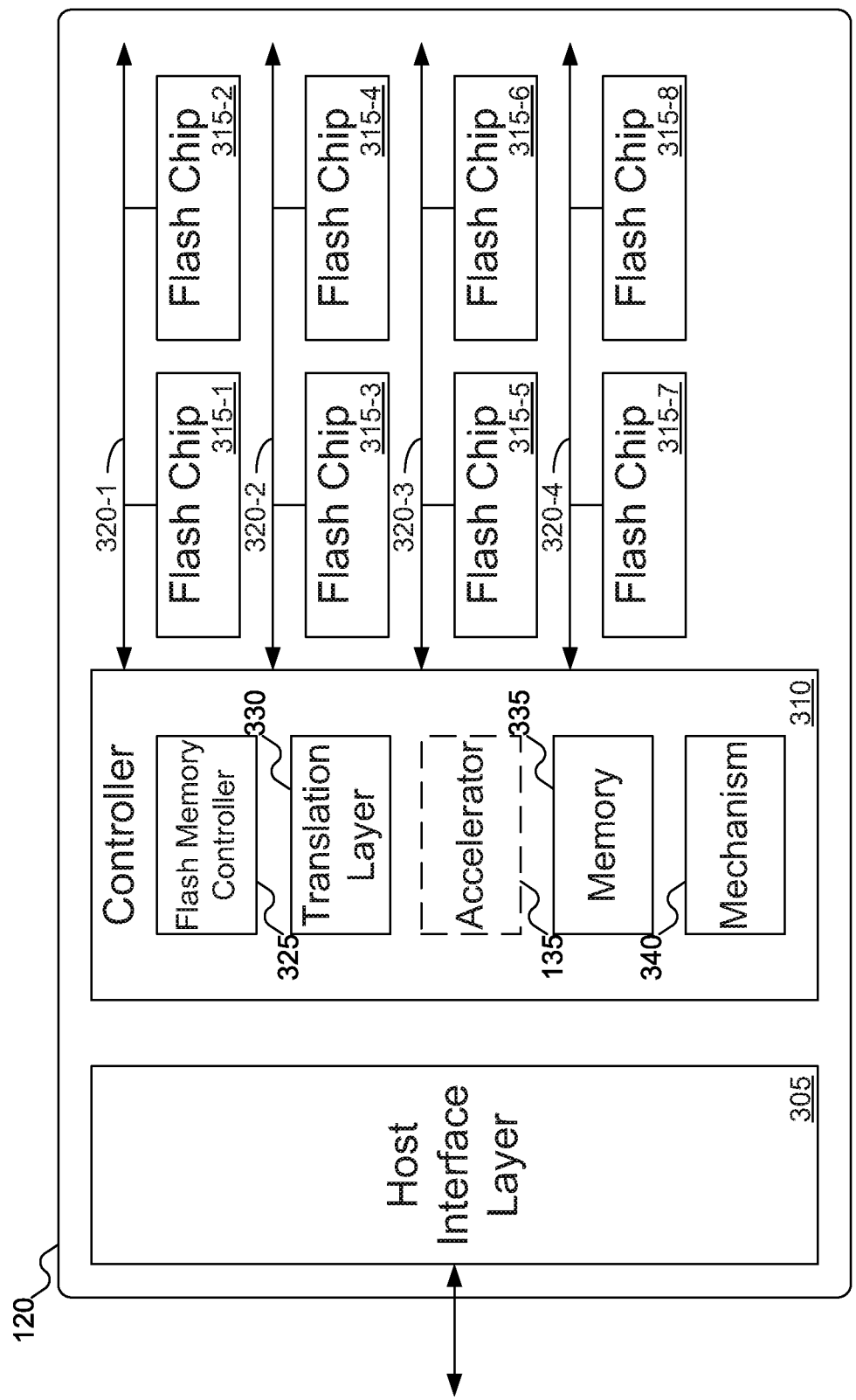
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage" or just "storage", and which may be referred to collectively as flash memory chips 315 or storage 315), which may be organized into various channels 320-1 through 320-4 (which may be referred to collectively as channels 320). Host interface layer 305 may manage communications between storage device 120 and other components (such as processor 110 of FIG. 1). Host interface layer 305 may also manage communications with devices remote from storage device 120. That is, host interface layer 305 may manage communications with devices other than processor 110 of FIG. 1 (for example, accelerator 135 of FIG. 1, if not included as part of storage device 120), and which may be local to or remote from machine 105 of FIG. 1: for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315 using flash memory controller 325. Controller 310 may also include translation layer 330 which may manage the mapping of logical addresses (such as logical block addresses (LBAs)) as used by host 105 of FIG. 1 to physical addresses (such as physical block addresses (PBAs)) where the data is actually stored on storage device 120. By using translation layer 330, machine 105 of FIG. 1 does not need to be informed when data is moved from one physical address to another within storage device 120.

In some embodiments of the disclosure, controller 310 may include accelerator 135. Accelerator 135 may be omitted from storage device 120 (or perhaps more accurately, may be external to controller 310 or storage device 120), which is represented by the dashed lines around accelerator 135.

Controller 310 may include memory 335. Memory 335 may be a memory within storage device 120 (as compared with memory 115 of FIG. 1 in host 105 of FIG. 1). Like memory 115 of FIG. 1, memory 335 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired; but as storage device 120 includes non-volatile storage in flash chips 315, it may be expected that memory 115 is more often volatile storage. Memory 335 may act as a faster storage for data stored on flash chips 315, and may act as a cache for data stored on flash chips 315. Accelerator 135 may access data from memory 335 as an alternative to accessing data from flash chips 315.

Finally, controller 310 may include mechanism 340. Mechanism 340 may be the mechanism by which storage device 120 manages the bias mode for data in storage 315. Mechanism 340 may also be called a device coherency controller or a device coherency engine. Mechanism 340 may include a circuit (such as a field programmable gate array (FPGA), an application-specific integrated circuit (ASIC), or some other form of circuitry) designed to manage bias mode in storage device 120, or mechanism 340 may include a processor executing software (which may be stored in some non-volatile storage in storage device 120) to manage bias mode in storage device 120. Mechanism 340 may also include some form of storage (which may be volatile or non-volatile, depending on the embodiments of the disclosure) for various data used in managing bias mode in storage device 120. This storage may include, for example, some form of memory, such as DRAM, or some other flash storage. The specifics of mechanism 340 are discussed further below.

While FIG. 3 shows storage device 120 as including eight flash memory chips 315 organized into four channels 320, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits. Requests may be issued to storage device 120 by, for example, processor 110 of FIG. 1 or accelerator 135. In some embodiments of the disclosure, aside from internal management of the data as stored on flash chips 315, storage device 120 may be thought of as a reactive device, rather than initiating any actions.

In some embodiments of the disclosure, a storage device may be divided into units of storage of various size. For example, an SSD might be divided into pages, each of which may store approximately 8 kilobytes (KB) ($2^{14}$ bytes) of data. A block may include 128 pages: therefore, a block may be approximately 1 megabyte (MB) ($2^{21}$ bytes) in size. In addition, blocks may be grouped together to form superblocks.

An SSD might include such various unit sizes because different operations may be performed on different units. For example, an SSD might read or write a page of data. So, when processor 110 of FIG. 1 issues a read or write request, processor 110 of FIG. 1 may provide up to one full page of data to be written to the SSD (the page may be padded with any desired bits to fill the page) or a buffer large enough to store one full page of data to be read from the SSD.

But SSDs typically do not support overwriting of data. That is, if processor 110 of FIG. 1 wants to replace some data already written to the SSD, the SSD might instead write the updated data to a new page, and invalidate the original page. Translation table 330 may then be updated to reflect the new page where the updated data is stored.

Because SSDs might invalidate a page rather than overwriting it with new data, at some point the SSD may erase the data on the invalidated page (so that new data may be written to the page). This process may be termed garbage collection. But SSDs might erase data in units of blocks (or superblocks), rather than in units of pages. Thus, to recover pages that have been marked as invalidated, the SSD might need to erase all data in the block including that page.

If the SSD erases blocks rather than pages, then the SSD might wait until all the pages in the block have been erased. But there is no way to know when (or even if ever) that all the pages in an individual block will be invalidated. If the SSD were to wait until all the pages in a block are invalidated before erasing the block, the SSD might run out of free space. Thus, garbage collection might sometimes involve erasing a block that stores some valid data. To prevent the data loss, the SSD may copy the valid data from the block to a free page, and then may erase the block (thereby returning the block to the free block pool and making all of the pages in that block available to store data again).

As discussed above, a storage device, such as storage device 120, that supports a cache coherent interconnect protocol may be viewed as an extension of memory 115 of FIG. 1. When storage device 120 receives a load or store request (or, alternatively, a read or write request), mechanism 340 may determine the bias mode of the page with the data being requested. Mechanism 340 may also determine whether the requested data is currently cached in memory 335. Then, depending on the bias mode of the page and whether the data is currently cached in memory 335, mechanism 340 may then read data from or write data to memory 335, read data from or write data to memory 335 (for data in device bias mode), read data from or write data to memory 115 of FIG. 1 (for data in host bias mode), and/or perform bias switching, using the various embodiments described below.

Figures 4, 5:
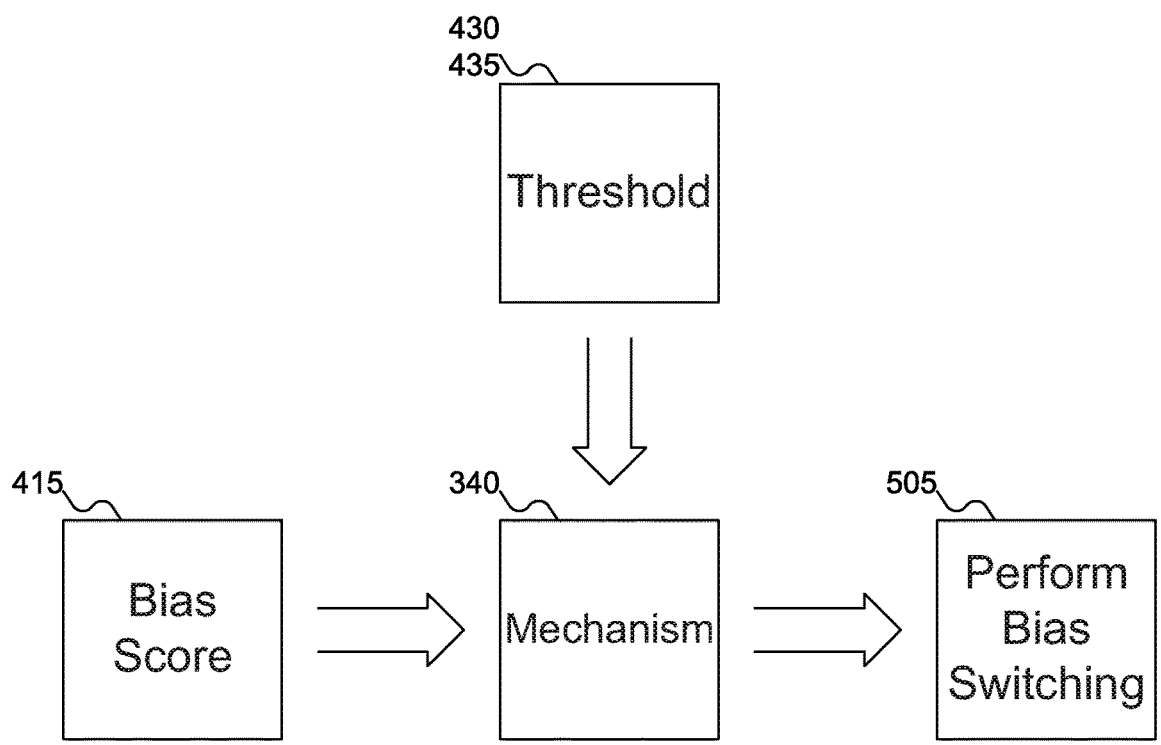
FIG. 4 shows a bias score table that may be used by the storage device of FIG. 1 for bias mode management, according to embodiments of the disclosure.
FIG. 5 shows how the mechanism of FIG. 3 may determine when to switch bias mode using the bias score of FIG. 4, according to embodiments of the disclosure.

FIG. 4 shows a bias score table that may be used by storage device 120 of FIG. 1 for bias mode management, according to embodiments of the disclosure. In some embodiments of the disclosure, storage device 120 of FIG. 1 may include bias score table 405. Bias score table 405 may include a bias score for chunks of data stored in storage 315 of FIG. 3 of storage device 120 of FIG. 1. The term "chunk", as used herein, is intended to refer to any desired unit of storage on storage device 120 of FIG. 1. For example, a chunk may represent a cache line, a page, a block, a superblock, a sector, or any other desired unit of storage on storage device 120 of FIG. 1. In addition, a chunk may represent a unit of storage that is different from other defined sizes in storage device 120 of FIG. 1. For example, in some embodiments of the disclosure, a page might include approximately 8 KB of storage and a block might include approximately 1 MB of storage, whereas a chunk might be determined to include approximately 4 KB ($2^{13}$ bytes) of storage. Or a page might include approximately 8 KB of storage, whereas a chunk might be determined to include approximately 4 KB of storage. In other words, the size of a chunk may be any desired size.

Storage 315 of FIG. 3 on storage device 120 of FIG. 1 may then be divided into units based on the chunk size, and each unit may be assigned an identifier (ID). For example, if storage device 120 of FIG. 1 includes a total of 500 gigabytes (GB) of storage, and each chunk includes 4 KB of storage, then there are 134,217,728 ($2^{28}$) chunks of storage. The IDs for the chunks might then run from 1 to 134,217,728. Or, as it is common in computers to start numbering from 0, the IDs for the chunks might run from 0 to 134,218,727. Using hexadecimal notation, the IDs for the chunks might then run from 0x0000 0000 to 0x07FF FFFF.

In FIG. 4, bias score table 405 includes columns for chunk ID 410, score 415, and bias mode 420. Bias score table 405 also shows three entries 425-1 through 425-3 (which may be referred to collectively as entries 425), but embodiments of the disclosure may include any number (zero or more) of entries in bias score table 405.

In some embodiments of the disclosure, bias score table 405 may include entries 425 only for chunks that are currently being tracked. For example, bias score table 405 shows entries 425 for chunk IDs 0x0000, 0x0001, and 0x0002. In this manner, bias score table 405 may store entries for only chunks that are in use. This may save some storage space in bias score table 405 over storing entries for each chunk in storage device 120 of FIG. 1, whether or not storing any data. On the other hand, if bias score table 405 includes space for every chunk in storage device 120 of FIG. 1, then the chunk ID may be used to index into bias score table 405, and column ID 410 may be omitted from bias score table 405.

Bias score 415 may represent the current bias score for the associated chunk in entry 425. For example, for chunk ID 0x0000, the bias score is currently 0, whereas for chunk ID 0x0001, the bias score is currently 2, and for chunk ID 0x0002, the bias score is currently −3.

When a particular chunk is accessed by host or device (such as accelerator 135 of FIG. 1), bias score table 405 may be updated to reflect that access. In some embodiments of the disclosure, bias score 415 may be incremented by one when accessed by the host, and bias score 415 may be decremented by one when accessed by the device. When bias score 415 reaches an appropriate threshold, bias mode 420 for that chunk may be switched from host bias mode to device bias mode or vice versa. Other embodiments of the disclosure may adjust the bias score in different ways as a chunk is accessed: all such embodiments of the disclosure are intended to be covered by the disclosure.

Bias mode 420 may reflect the current bias for the associated chunk. For example, the value "0" may reflect host bias mode, and the value "1" may reflect device bias mode. Thus, for example, bias score table 405 shows that the chunks with IDs 0x0000 and 0x0001 are currently in host bias mode, and the chunk with ID 0x0002 is currently in device bias mode.

As the bias mode for a chunk may be either host bias mode or device bias mode, a single bit may be used to represent bias mode 420. The number of bits used to represent bias score 415 may depend on the range of values established for bias score 415. For example, if bias score 415 is permitted to range between −3 and +3, then the total range for bias score 415 is seven values, and three bits may be used to represent bias score 415. (Note that the number of bits used to represent bias score 415 may be large enough to include values outside the permitted range: bias score 415 may be limited to a subset of all possible values supported by the number of bits used to represent bias score 415.) Thus, in embodiments of the disclosure where bias score table 405 is large enough for every chunk in storage device 120 of FIG. 1, if storage device 120 of FIG. 1 includes 134,217,728 total chunks, the total storage needed for bias score table 405 may be 134,217,728×(3+1)=536,870,912 ($2^{30}$) bits, or 67,108,864 ($2^{27}$) bytes: approximately 67 MB of storage. For a storage device that offers approximately 500 GB ($2^{40}$ bytes) of storage, bias score table 405 may use approximately 0.001% of the total storage.

As mentioned above, when bias score 415 reaches an appropriate threshold, the bias mode for the chunk may be switched. In some embodiments of the disclosure, these thresholds may be used for all bias scores 415, regardless of which chunk bias score 415 is for. For example, when bias score 415 for a particular chunk reaches −3, the bias mode may be switched from host bias mode to device bias mode, and when bias score 415 for a particular chunk reaches +3, the bias mode may be switched from device bias mode to host bias mode. But in other embodiments of the disclosure, each chunk may have its own range of values for bias score 415. In such embodiments of the disclosure, bias score table 405 may include the thresholds for each chunk. For example, device threshold 430 may represent the threshold for switching a chunk from host bias mode to device bias mode, and host threshold 435 may represent the threshold for switching a chunk from device bias mode to host bias mode. While bias score table 405 shows the same thresholds for all chunks, embodiments of the disclosure may thus support different thresholds for switching bias mode for different chunks. Obviously, if the same threshold or thresholds are used for all chunks, the common threshold or thresholds may be omitted from bias score table 405.

One question not yet addressed is what should happen if a chunk is accessed by the same source (the host or the device) that currently holds the bias mode. In some embodiments of the disclosure, mechanism 340 of FIG. 3 may determine the current bias mode for the chunk. If the bias mode for the chunk currently favors the source accessing the chunk, then bias score 415 may be unchanged. In such embodiments of the disclosure, bias score 415 may be expected to move in one direction until it reaches a threshold, after which bias score 415 will move in the other direction until it reaches the other threshold, and so on. In other embodiments of the disclosure, mechanism 340 of FIG. 3 may compare bias score 415 with thresholds 430 and 435: as long as bias score 415 is within the range determined by thresholds 430 and 435, mechanism 340 of FIG. 3 may continue to increment or decrement bias score 415 with each access by a source. In such embodiments of the disclosure, bias score 415 may be expected to vary, but only within the range set by thresholds 430 and 435. In still other embodiments of the disclosure, mechanism 340 of FIG. 3 may check that incrementing or decrementing bias score 415 will not result in an overflow or underflow (that is, a value too large or too small to fit in the available number of bits): provided bias score 415 does not overflow or underflow, bias score 415 may be incremented or decremented without regard to thresholds 430 and 435.

Another question not yet addressed is if bias score 415 should ever be reset. In some embodiments of the disclosure, bias score 415 is reset to a default value, such as zero, only during power-up. In other words, when mechanism 340 of FIG. 3 switches the bias mode for a chunk, bias score 415 for that chunk may remain at its current value after the bias mode is switched. In other embodiments of the disclosure, bias score 415 may be reset to a default value whenever the bias mode for the chunk is switched. By resetting the bias mode for a chunk to a default value, it may be easier for bias mode to be switched again. In still other embodiments, regardless of whether bias score 415 is reset when the bias mode for the chunk is switched, a software request may be used to reset bias score 415 (for either individual chunks or for the entirety of bias score table 405). For example, an application might want to reset bias score 415 for all data the application accesses to avoid any earlier accesses affecting how and when bias might occur.

FIG. 5 shows how mechanism 340 of FIG. 3 may determine when to switch bias mode using bias score 415 of FIG. 4, according to embodiments of the disclosure. In FIG. 5, mechanism 340 may use bias score 415 and one (or both) of thresholds 430 or 435. If bias score 415 is greater than or equal to threshold 435 (or less than or equal to threshold 430), then mechanism 340 may perform bias mode switching 505.

Figure 6:
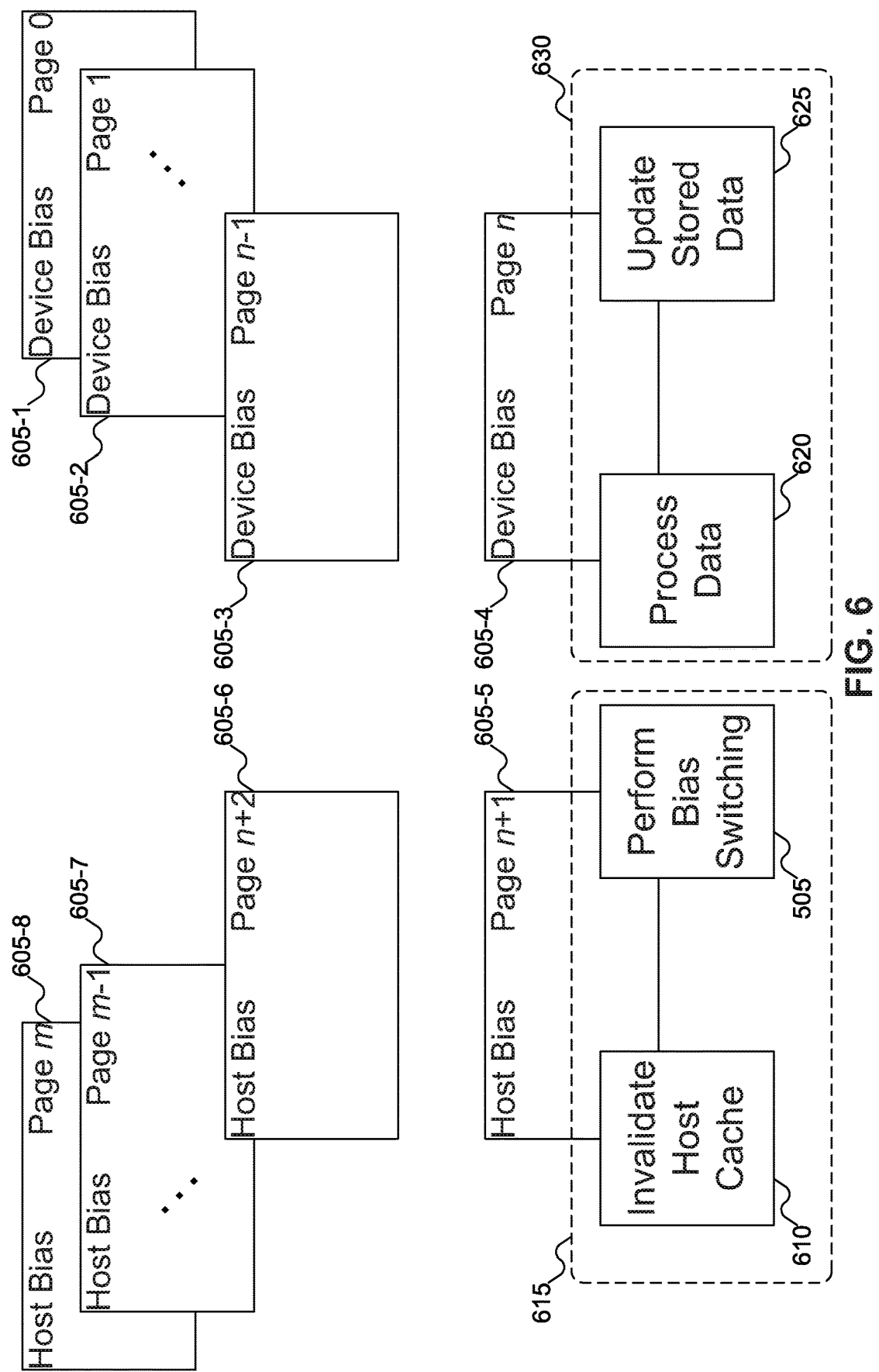
FIG. 6 shows pages in the storage device of FIG. 1 undergoing bias mode switching, according to embodiments of the disclosure.

FIG. 6 shows pages in storage device 120 of FIG. 1 undergoing bias mode switching, according to embodiments of the disclosure. In FIG. 6, mechanism 340 of FIG. 3 may perform look-ahead bias mode switching. For example, device 135 of FIG. 1 may need access to data in a number of contiguous pages in storage device 120 of FIG. 1: these contiguous pages may form a region. Put another way, a region may be defined as a contiguous block of addresses where data is stored (these addresses may be either logical addresses as used by host 105 of FIG. 1 or physical addresses where storage device 120 of FIG. 1 stores the data.) When device 135 of FIG. 1 accesses the first page, mechanism 340 of FIG. 3 may start switching the bias mode for the other pages in the region to device bias mode, to expedite data access by device 135 of FIG. 1.

In FIG. 6, pages 605-1 through 605-8 (which may be referred to collectively as pages 605) may be pages of data in storage device 120 of FIG. 1. Pages 605 may form a region or a range of addresses, with page 605-1 contiguous to page 605-2, page 605-2 contiguous to pages 605-1 and 605-3, and so on.

In FIG. 6, pages 605-1 through 605-3 have been switched to device bias mode by mechanism 340 of FIG. 3, and have been processed by device 135 of FIG. 1. Page 605-4 has been switched to device bias mode by mechanism 340 of FIG. 3, and is being processed by device 135 of FIG. 1. Page 605-5 is being switched to device bias mode by mechanism 340 of FIG. 3. Finally, pages 605-6 through 605-8 are waiting to be switched to device bias mode by mechanism 340.

To switch page 605-5 to device bias mode, mechanism 340 of FIG. 3 may invalidate any data in a host cache, as shown by operation 610. Once copies of page 605-5 in any host caches have been invalidated, page 605-5 may be switched to device bias mode, as shown by operation 505. Operations 610 and 505 may be considered part of switching page 605-5 to device bias mode, as shown by grouping 615.

Once a page, such as page 605-4, has been switched to device bias mode, device 135 of FIG. 1 may process the data, as shown by operation 620, and the updated data may be stored, as shown by operation 625. Operations 620 and 625 may be considered part of processing by device 135 of FIG. 1, as shown by grouping 630.

As pages 605 are part of a region, when device 135 of FIG. 1 begins to access page 605-1, mechanism 340 of FIG. 3 may recognize that device 135 of FIG. 3 may want access to all of pages 605. While device 135 of FIG. 1 might wait until all of pages 605 are in device bias mode before beginning its processing of any of the data in pages 605, it is possible for device 135 of FIG. 1 to process page 605-1 while page 605-2 is being switched to device bias mode, to process page 605-2 while page 605-3 is being switched to device bias mode, and so on. In other words, rather than waiting for all of pages 605 to be in device bias mode, device 135 of FIG. 1 may process data as each page switches to device bias mode. This may result in faster processing of the data by device 135 of FIG. 1.

To achieve this result, mechanism 340 of FIG. 3 may switch pages 605 to device bias mode in the background, before device 135 of FIG. 1 attempts to access the data. Put another way, mechanism 340 of FIG. 3 may switch pages 605 to device bias mode in anticipation that device 135 of FIG. 1 will request access to the data of pages 605. Given information about the region (or the range of addresses in the region), mechanism 340 of FIG. 3 may proactively switch pages 605 to device bias mode to expedite operations by device 135 of FIG. 1.

Note that while FIG. 6 describes the region as including pages 605, embodiments of the disclosure may include any definition of a region. For example, a region might be defined as a range of addresses without reference to pages 605; or a region might be defined as a number of chunks or some other way to portion the region. However the region is defined, each page, chunk, or portion of the region may be switched to device bias mode in turn based on being part of the region. Doing such switching contiguously may have the advantage of making data available to device 135 of FIG. 1 in the order in which device 135 of FIG. 1 may expect that data.

Figure 7:
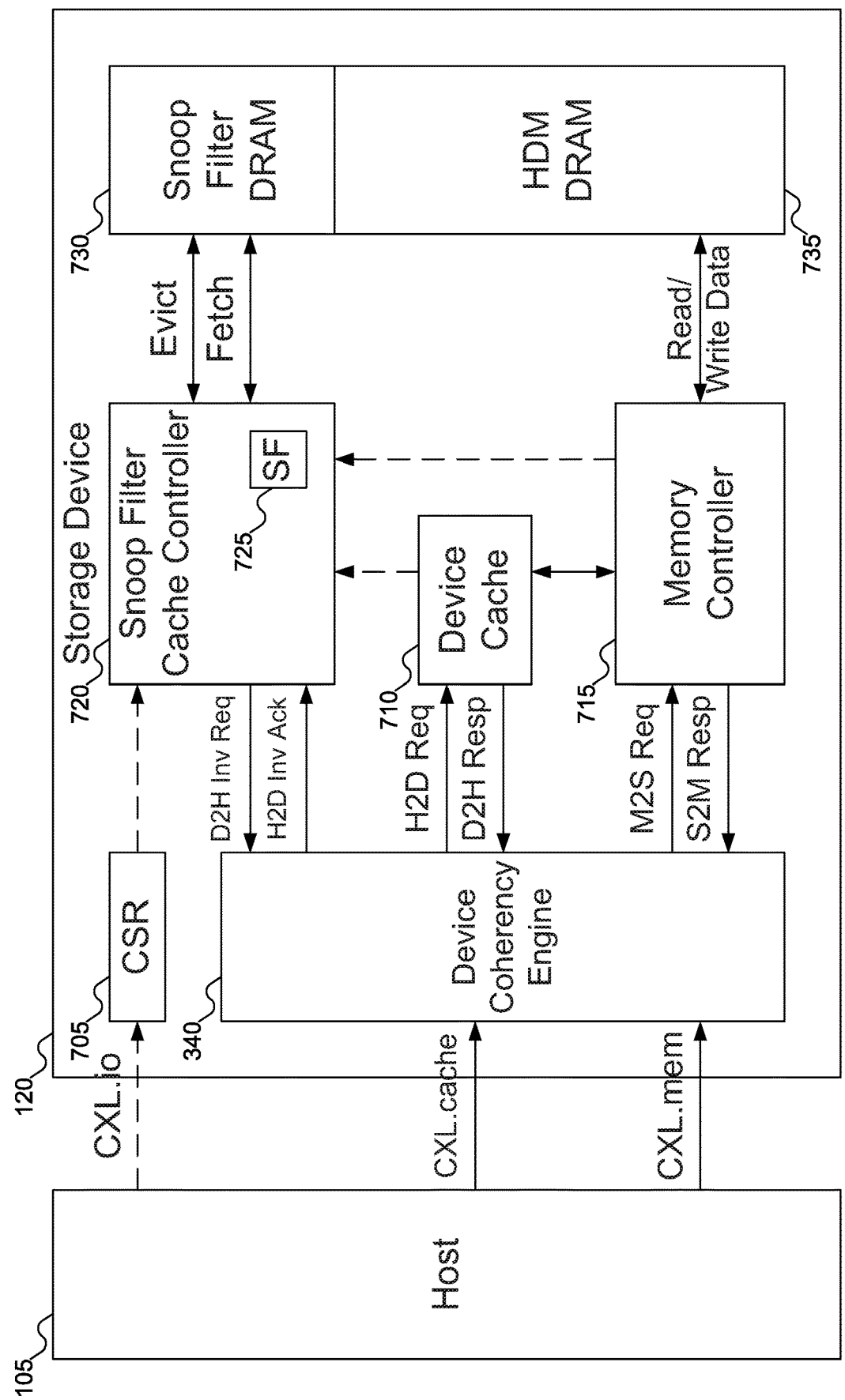
FIG. 7 shows an architecture for the storage device of FIG. 1 to use a snoop filter for bias mode management, according to embodiments of the disclosure.

FIG. 7 shows an architecture for storage device 120 of FIG. 1 to use a snoop filter for bias mode management, according to embodiments of the disclosure. In FIG. 7, host 105 may send requests to storage device 120. Depending on how storage device 120 is implemented, there may be three different types of commands that host 105 may send to storage device 120. Block-level protocol requests, shown as CXL.io requests in FIG. 7, may be used to perform administrative requests of the snoop filter in mechanism 340 of FIG. 3. Byte-level protocol requests, shown as CXL.mem requests in FIG. 7, may be used to access data from storage device 120 as though storage device 120 was an extension of memory 115 of FIG. 1. Cache requests, shown as CXL-.cache requests in FIG. 7, may be used manage the cache status of data: that is, to keep storage device 120 informed of what data is currently cached by processor 110, and whether the data in storage device 120 is up-to-date or possibly out-of-date relative to data in the cache of processor 110.

Control and status register (CSR) 705 may receive information from host 105 via block-level protocol requests. CSR 705 may then perform management on the snoop filter in storage device 120: for example, an application may use CSR 705 to learn the status of a particular data from the snoop filter, or to reset some information in the snoop filter. As CSR 705 may be used for snoop filter access, such block-level protocol requests are for management rather than for data access, which is why the block-level protocol access is shown using a dashed line in FIG. 7. In some embodiments of the disclosure, as block-level protocol requests may be used for access to the snoop filter, read/write requests from storage device 120 may be disabled, as such requests might share block-level protocol access to storage device 120.

Device coherency engine 340 may receive byte-level protocol requests and cache requests from host 105, and may issue requests to other components of storage device 120. For example, based on cache requests from host 105, device coherency engine 340 may send host to device requests-to-device cache 710, and receive device-to-host responses from device cache 710. Similarly, based on byte-level protocol requests from host 105, device coherency engine 340 may issue master-to-slave requests to memory controller 710, and may receive master-to-slave responses from memory controller 715.

Device cache 710, upon receiving a host-to-device request involving data (either read or written), may communicate with memory controller 715 to process the request. Memory controller 715 may then communicate with the host-managed device (HDM) memory to read data from or write data to the HDM memory. (While FIG. 7 shows the HDM memory as DRAM, which may be understood to be volatile storage, embodiments of the disclosure may use persistent memory or non-volatile memory instead of HDM memory, and/or data may also be written to a non-volatile storage not shown in FIG. 7.)

Storage device 120 may also include snoop filter cache controller 720, which may be responsible for managing snoop filter 725. Snoop filter 725, which may be a table, may be stored in snoop filter cache controller 720, in snoop filter memory 730, which may be separate from HDM memory 735 or part of HDM memory 735, in HDM memory 735, or in any combination thereof. For example, snoop filter 725 might be stored partially in a cache in snoop filter cache controller 720, partly in snoop filter memory 730, and partly in HDM memory 735. The structure of snoop filter 725 is discussed further with reference to FIG. 8 below.

Snoop filter cache controller 720 may perform several functions. First, snoop filter cache controller 720 may update snoop filter 725 to reflect how host 105 is currently using various chunks. Thus, whenever host 105 accesses data from storage device 120, snoop filter cache controller 720 may update snoop filter 725. This may be shown by the dashed lines from device cache 710 and memory controller 715 to snoop filter cache controller 720: device cache 710 and memory controller 715 may inform snoop filter cache controller 720 when host 105 accesses data, so that snoop filter cache controller 720 may update snoop filter 725.

Second, snoop filter cache controller 720 may fetch data for snoop filter 725 from snoop filter memory 730 (or HDM memory 735, depending on where snoop filter 725 may be stored). For example, the cache in snoop filter cache controller 720 might only have room for a few megabytes of data, but the full snoop filter 725 might be tens of megabytes in size. Snoop filter cache controller 720 may store a subset of snoop filter 725 in its local cache, with the rest of snoop filter 725 stored in snoop filter memory 730. When snoop filter cache controller 720 needs access to data in snoop filter 725 not currently in the local cache of snoop filter cache controller 720, snoop filter cache controller 720 may fetch some additional data from snoop filter memory 730 (and may write some data from snoop filter 725 to snoop filter memory 730 to make room for the newly fetched data).

Third, snoop filter cache controller 720 may evict data from snoop filter 725. For example, if all entries in snoop filter 725 are currently in use and host 105 requests access for some data for which there is no entry in snoop filter 725, snoop filter cache controller 720 may evict some data from snoop filter 725. As part of evicting data from snoop filter 725, snoop filter 720 may send a device-to-host invalidate request to device coherency engine 340, requesting that host 340 invalidate a particular data from its cache, to which host 105 may issue a host-to-device invalidate acknowledgement. Note that host 105 might not have that data in its cache, as the size of the cache in host 105 may differ from the size of snoop filter 725. For example, if each cache line stored in the cache in host 105 is 256 bytes, and host 105 includes an 8 MB cache, then the cache in host 105 has room for 32,768 ($2^{16}$) total cache lines. But if snoop filter 725 (spread out across the cache in snoop filter cache controller 720 and snoop filter memory 730) has room for, say, 1,048,576 ($2^{21}$) cache lines, then snoop filter 725 may store information about at least one cache line not stored in the cache in host 105.

Invalidating data from a cache in host 105 might involve simply informing host 105 that the data in its cache should be deleted. But if the cache in host 105 stores data that is more current than the data in storage device 120, then storage device 120 should be updated with the current data. In such a situation, snoop filter cache controller 720 may issue a back-invalidate request, rather than just an invalidate request. Upon receiving the device-to-host back-invalidate request, host 105 may update the data on storage device 120 by issuing a cache or byte-level protocol request to write the current data to storage device 120.

Snoop filter 725 may track whether or not host 105 intends to change the data based on the type of request issued by host 105. That is, host 105 might issue a request (either a cache request or a byte-level protocol request) that may specify whether host 105 intends to modify the data or not. For example, a cache coherent protocol may specify whether data is in one of four different states: Modified (host 105 may cache the data, and the data in storage device 120 may be out-of-date); Exclusive (host 105 may cache the data, but the data in storage device 120 is current); Shared (the data may be cached by any number (one or more) of hosts, but the data in storage device 120 is current); or Invalid (the data is not currently cached by any host). Host 105 may specify which state the data may be in, either as a parameter of the request or by using different request (which may specify the state). Various requests may also be issued, by snoop filter cache controller 720, host 105, or any other host currently caching the data, to investigate the current state of the data, and which might or might not change the current state of the data. For example, an invalidate request might be issued to force any modified data to be written to storage device 120 and to return the state of that data to the Invalid state, or to inquire as to the current state of the data in snoop filter 725.

In some embodiments of the disclosure, HDM memory 735 may be volatile memory; in other embodiments of the disclosure, HDM memory 735 may be persistent memory. The implementation depends on the needs of host 105. Whether or not snoop filter memory 730 is persistent, on the other hand, may depend on whether any data cached by host 105 is persistent. If host 105 includes a persistent cache, then snoop filter 725 may need to be stored in persistent storage as well, so that if power is interrupted the state of snoop filter 725 is not lost (the results of snoop filter 725 being lost due to a power interruption when host 105 includes a persistent cache that retains its data might be unpredictable, might result in inconsistent data, or might result in accurate calculations, among other possibilities.

Note, too, that host 105 might be remote to storage device 120. That is, host 105 in FIG. 7 might represent a processor that is remotely connected to storage device 120. In that case, a power interruption to storage device 120 might not result in a power interruption to host 105, which would mean that any data in a cache in host 105 might not be lost when the power to storage device 120 is interrupted. If such a situation is possible, then snoop filter 725 may need to be persistent as well, for the same reasons discussed above.

Figure 8:
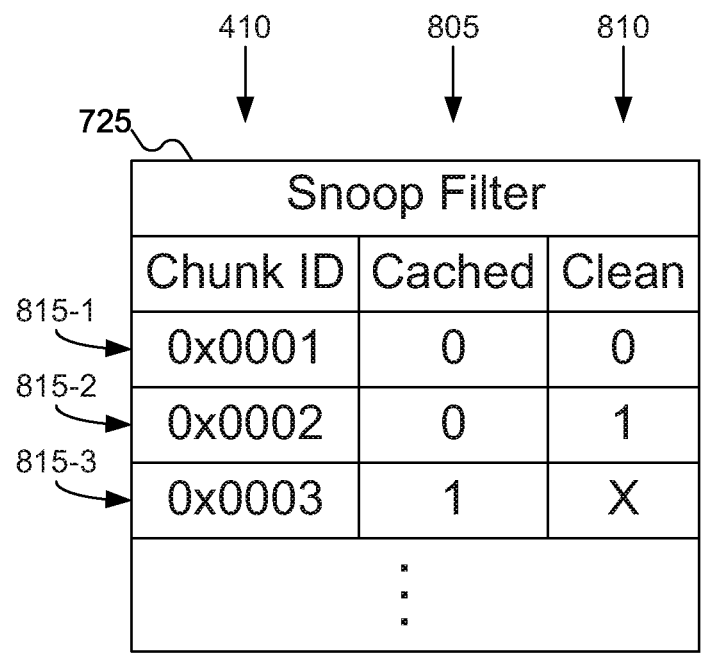
FIG. 8 shows data that may be stored by the snoop filter of FIG. 7 for bias mode management, according to embodiments of the disclosure.

FIG. 8 shows data that may be stored by snoop filter 725 of FIG. 7 for bias mode management, according to embodiments of the disclosure. In FIG. 8, snoop filter 725 is shown as a table. Snoop filter 725 may include columns for chunk ID 410, cached 805, and clean 810. Chunk ID 410 may store an ID for the chunk (which, as discussed above, may represent a cache line, a page, a block, a superblock, or any other desired unit of storage). Cached 805 may indicate whether that particular chunk is currently cached by host 105 of FIG. 1 (or any other host). For example, a value of zero may indicate that the data is currently cached by host 105 of FIG. 1, whereas a value of one may indicate that the data is not currently cached by host 105. Snoop filter 725 may know that a particular chunk is no longer cached by host 105 of FIG. 1 if, for example, host 105 of FIG. 1 writes the data back and specifies that the data is no longer cached. (Since snoop filter 725 may track its own information, snoop filter 725 might not evict a chunk just because host 105 of FIG. 1 no longer caches the chunk.) Thus, for example, entries 815-1 and 815-2 may indicate that the relevant chunks are currently cached by host 105 of FIG. 1, whereas entry 815-3 may indicate that the relevant chunk is not currently cached by host 105 of FIG. 1.

Clean 810 may track whether a chunk currently cached by host 105 of FIG. 1 is clean or dirty. A clean chunk may be a chunk whose data as stored on storage device 120 of FIG. 1 is up-to-date: that is, host 105 of FIG. 1 has not updated the data or has indicated that the data is not being updated. A dirty chunk, on the other hand, may be a chunk whose data as stored on storage device 120 of FIG. 1 may be considered out-of-date, and that host 105 of FIG. 1 has indicated is or will be updated. Values of zero and one may be used to represent these two states. Thus, for example, entry 815-1 may indicate that the associated chunk is cached and is dirty, and entry 815-2 may indicate that the associated chunk is cached but is clean.

Note that clean 810 might not be relevant if the data is not cached on host 105 of FIG. 1. Thus, for example, entry 815-3 may indicate that the associated chunk is not currently cached by host 105 of FIG. 1. In that case, it is not important what value is used for clean 810 in entry 815-3. FIG. 8 represents this fact by using the value "X", which may be understood to mean "don't care". Since the value for clean 810 in entry 815-3 does not matter, either a zero or a one may be used for clean 810 in entry 815-3, without any loss of information.

The reason snoop filter 725 might store clean 810 is to decide whether to send an invalidate request or a back-invalidate request to host 105 of FIG. 1 if the associated chunk is evicted from snoop filter 725. For example, if entry 815 indicates that the data is clean, a invalidate request will suffice; if entry 815 indicates that the data is dirty, then host 105 of FIG. 1 may need to write the data back to storage device 120 of FIG. 1 to ensure the data for that chunk is current, and so a back-invalidate request may be issued. Alternatively, column 810 may be omitted, in which case back-invalidate requests may be issued for any chunks evicted from snoop filter 725 (and host 105 of FIG. 1 may decide whether any data needs to be written back to storage device 120 of FIG. 1).

While FIG. 8 shows snoop filter 725 as including three entries 815-1 through 815-3 (which may be referred to collectively as entries 815), embodiments of the disclosure may include any number (zero or more) entries 815 in snoop filter 725.

In terms of size, each entry 815 in snoop filter 725 may include enough bits identify the chunk, plus two bits to indicate whether the chunk is currently cached or not and whether the data is clean or not. The number of bits needed to identify the chunk may be a function of the size of storage device 120 of FIG. 1 and the size of an individual chunk of data. For example, if storage device 120 of FIG. 1 stores approximately 500 GB of data, and each chunk is 256 ($2^8$) bytes in size, then storage device 120 of FIG. 1 may include 2,147,483,648 ($2^{32}$) chunks, which may need 32 bits to identify an individual chunk. Thus, each entry 815 may use 34 bits of data. To store approximately 1,000,000 entries 815, snoop filter 725 may need a total of 35,651,584 (a little smaller than $2^{27}$) bytes. As with bias score table, this amount of space may be fairly negligible (approximately 0.006%) of the total capacity of storage device 120 of FIG. 1.

As discussed above, in some embodiments of the disclosure, data in storage device 120 of FIG. 1 may be accessed by more than one host 105 of FIG. 1. It therefore follows that a chunk of data may be cached by more than one host 105 of FIG. 1. If storage device 120 of FIG. 1 issues an invalidate (or back-invalidate) request, it may broadcast that request to all hosts 105 of FIG. 1. And if host 105 of FIG. 1 receives such a request, host 105 of FIG. 1 may forward the request to any other hosts that may have a copy of the data, to ensure that all caches are cleared.

Figure 9:
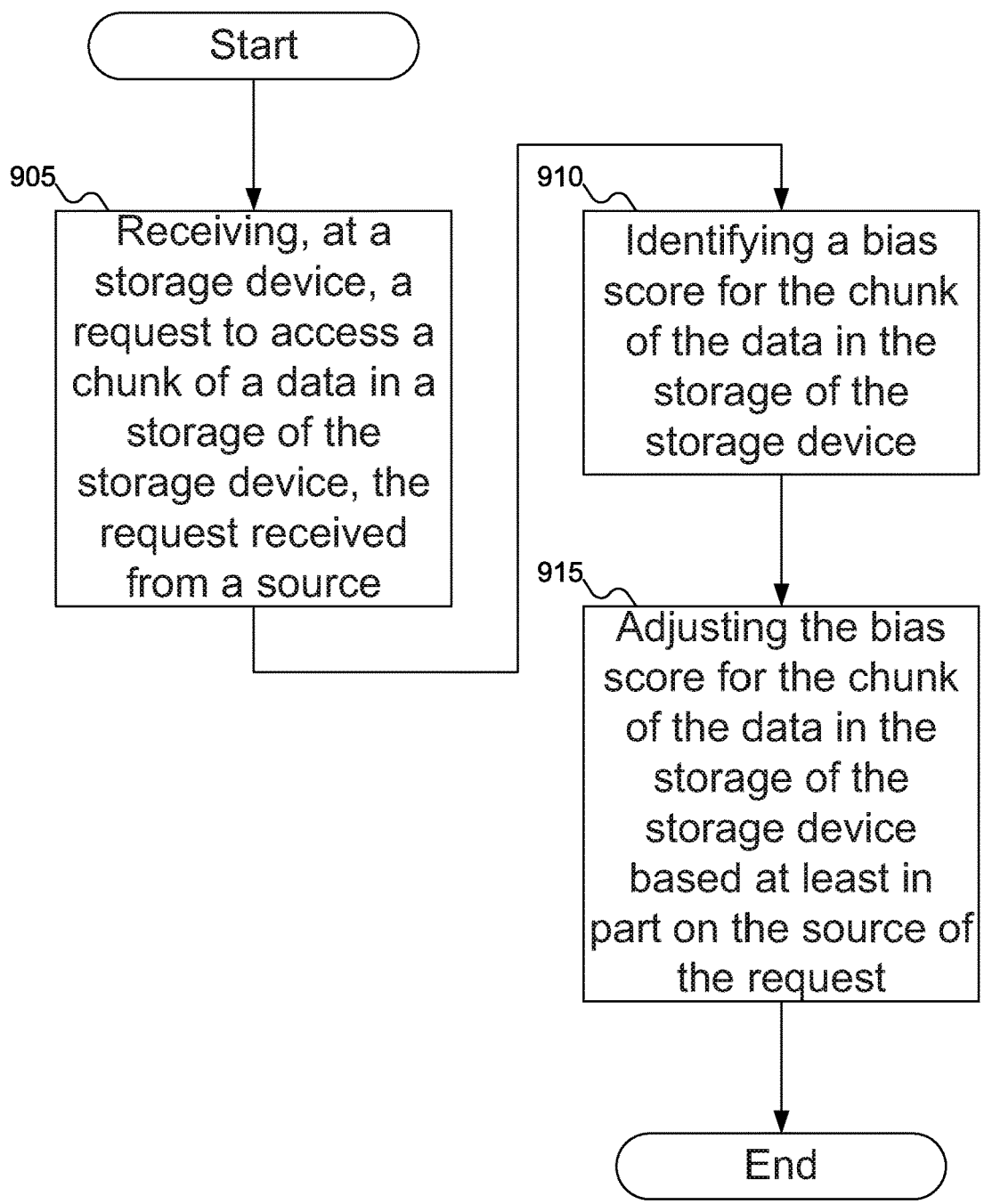
FIG. 9 shows a flowchart of an example procedure for the storage device of FIG. 1 to us the bias score of FIG. 4 to manage bias mode, according to embodiments of the disclosure.

FIG. 9 shows a flowchart of an example procedure for storage device 120 of FIG. 1 to us bias score 415 of FIG. 4 to manage bias mode, according to embodiments of the disclosure. In FIG. 9, at block 905, storage device 120 of FIG. 1 may receive a request from a source (which might be either host 105 of FIG. 1 or device 135 of FIG. 1) to access a chunk of data. At block 910, mechanism 340 of FIG. 3 may identify bias score 420 of FIG. 4: for example, by accessing bias score 420 of FIG. 4 from bias score table 405 of FIG. 4. Finally, at block 915, mechanism 340 of FIG. 3 may adjust bias score 420 of FIG. 4 for the chunk based on the source of the request.

Figure 10:
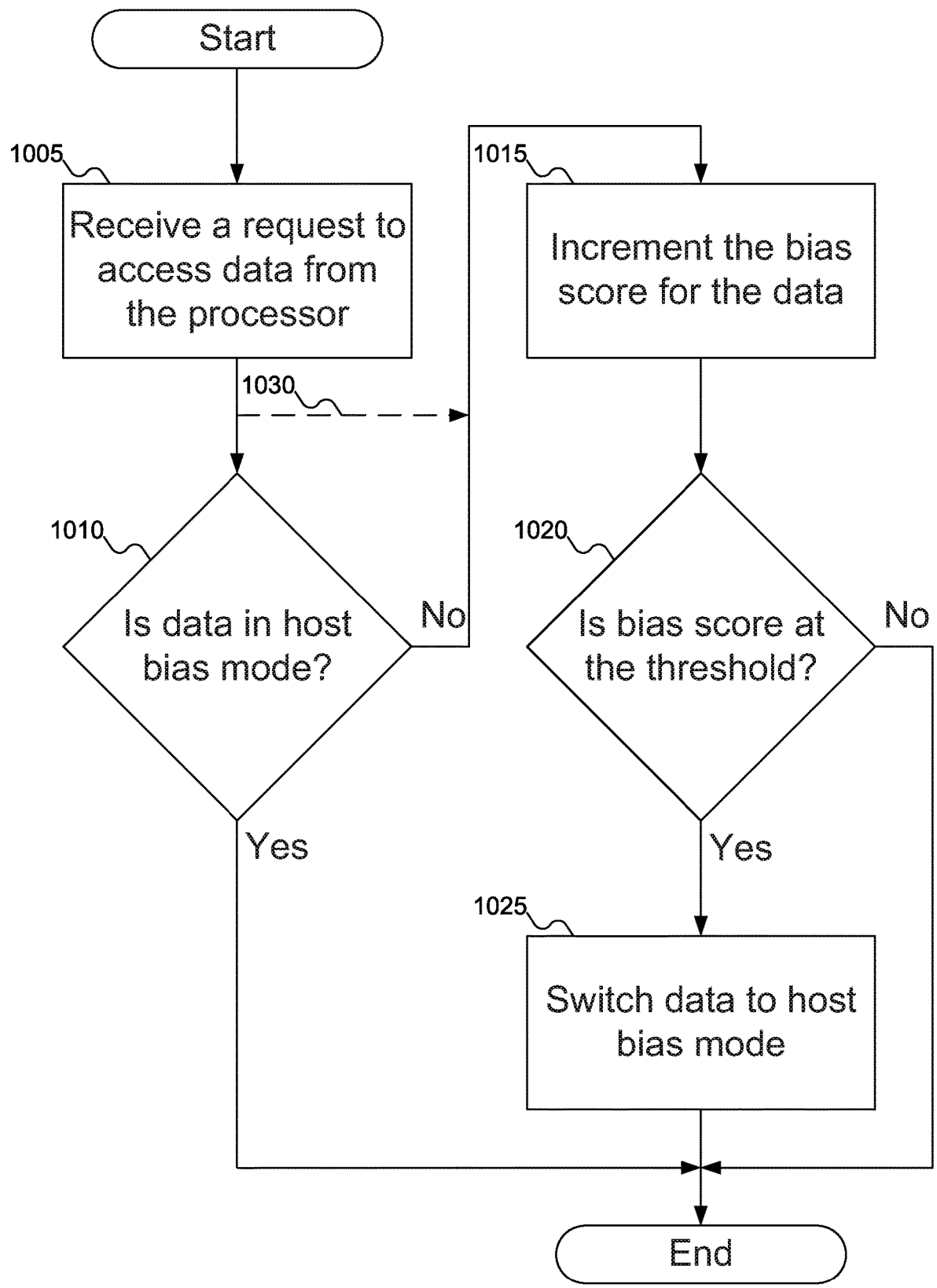
FIG. 10 shows a flowchart of an example procedure for the storage device of FIG. 1 to use the bias score of FIG. 4 when receiving a request from a host processor, according to embodiments of the disclosure.

FIG. 10 shows a flowchart of an example procedure for storage device 120 of FIG. 1 to use bias score 415 of FIG. 4 when receiving a request from processor 110 of FIG. 1, according to embodiments of the disclosure. In FIG. 10, at block 1005, storage device 120 of FIG. 1 may receive a request to access a chunk of data from processor 110 of FIG. 1. At block 1010, mechanism 340 of FIG. 3 may determine whether that chunk of data is currently in host bias mode. If so, then processing may end (by providing processor 110 of FIG. 1 with access to the data). Otherwise, at block 1015, mechanism 340 of FIG. 3 may increment bias score 420 of FIG. 4 for that chunk. As discussed above, in some embodiments of the disclosure, mechanism 340 of FIG. 3 might only increment bias score 420 of FIG. 4 if bias score is less than threshold 435 of FIG. 4; in other embodiments of the disclosure, mechanism 340 of FIG. 3 may increment bias score 420 of FIG. 4 without regard to threshold 435 of FIG. 4. At block 1020, mechanism 340 of FIG. 3 may check to see if bias score 420 of FIG. 4 is less than threshold 435 of FIG. 4. If bias score 420 of FIG. 4 is at least as large as threshold 435 of FIG. 4, then at block 1025 mechanism 340 of FIG. 3 may switch the bias mode for the chunk to host bias mode. Either way, processing may then end (by providing processor 110 of FIG. 1 with access to the data).

As discussed above, in some embodiments of the disclosure, mechanism 340 of FIG. 3 might increment bias score 420 of FIG. 4 even if the chunk of data in storage device 120 of FIG. 1 is in host bias mode. In such embodiments of the disclosure, block 1010 may be omitted, with processing always proceeding to block 1015, as shown by dashed line 1030.

Figure 11:
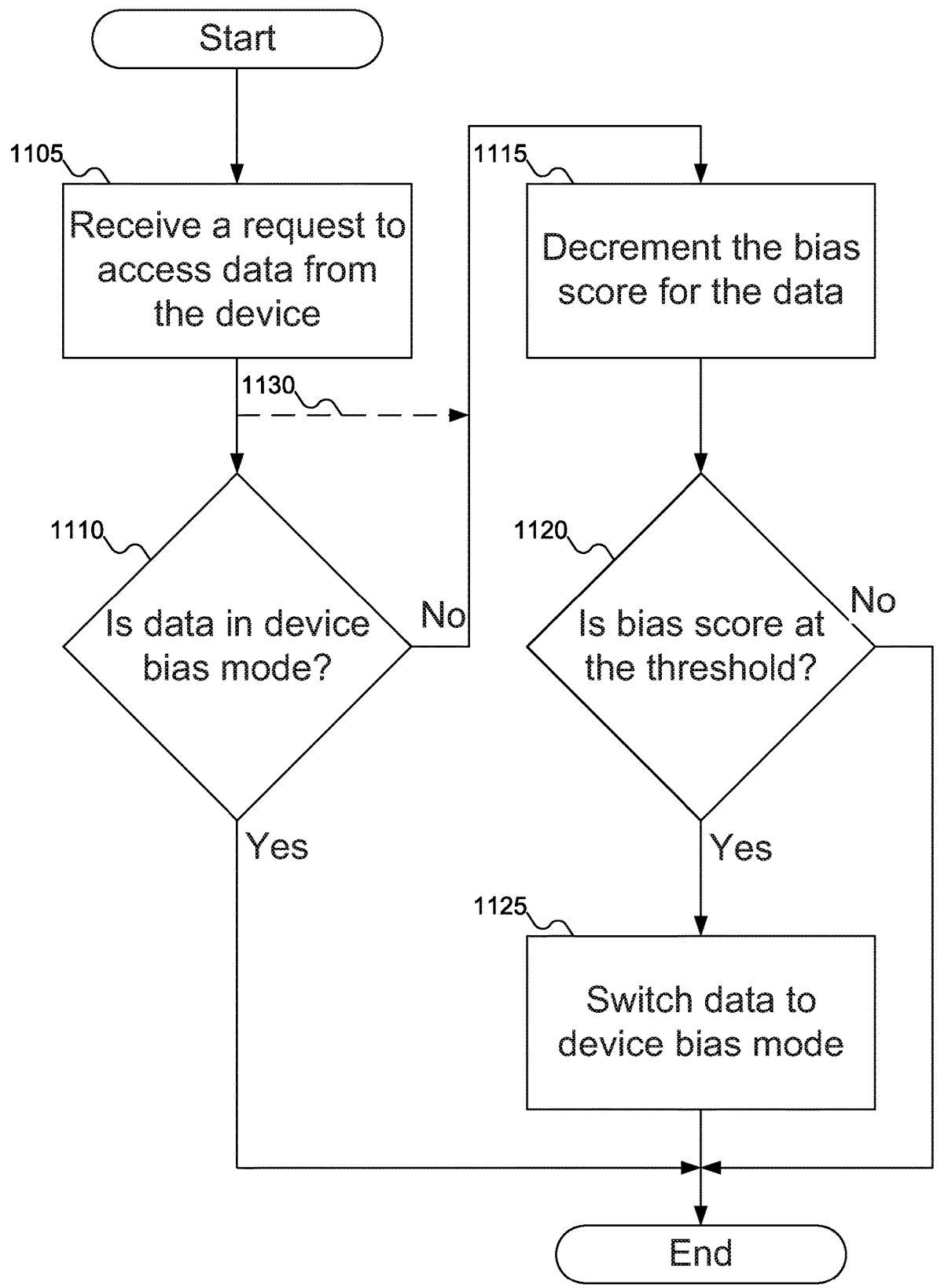
FIG. 11 shows a flowchart of an example procedure for the storage device of FIG. 1 to use the bias score of FIG. 4 when receiving a request from a device, according to embodiments of the disclosure.

FIG. 11 shows a flowchart of an example procedure for storage device 120 of FIG. 1 to use bias score 415 of FIG. 4 when receiving a request from device 135 of FIG. 1, according to embodiments of the disclosure. In FIG. 11, at block 1105, storage device 120 of FIG. 1 may receive a request to access a chunk of data from device 135 of FIG. 1. At block 1110, mechanism 340 of FIG. 3 may determine whether that chunk of data is currently in device bias mode. If so, then processing may end (by providing device 135 of FIG. 1 with access to the data). Otherwise, at block 1115, mechanism 340 of FIG. 3 may decrement bias score 420 of FIG. 4 for that chunk. As discussed above, in some embodiments of the disclosure, mechanism 340 of FIG. 3 might only decrement bias score 420 of FIG. 4 if bias score is greater than threshold 430 of FIG. 4; in other embodiments of the disclosure, mechanism 340 of FIG. 3 may decrement bias score 420 of FIG. 4 without regard to threshold 430 of FIG. 4. At block 1120, mechanism 340 of FIG. 3 may check to see if bias score 420 of FIG. 4 is greater than threshold 430 of FIG. 4. If bias score 420 of FIG. 4 is at least as small as threshold 430 of FIG. 4, then at block 1125 mechanism 340 of FIG. 3 may switch the bias mode for the chunk to device bias mode. Either way, processing may then end (by providing device 135 of FIG. 1 with access to the data).

As discussed above, in some embodiments of the disclosure, mechanism 340 of FIG. 3 might decrement bias score 420 of FIG. 4 even if the chunk of data in storage device 120 of FIG. 1 is in device bias mode. In such embodiments of the disclosure, block 1110 may be omitted, with processing always proceeding to block 1115, as shown by dashed line 1130.

Figure 12:
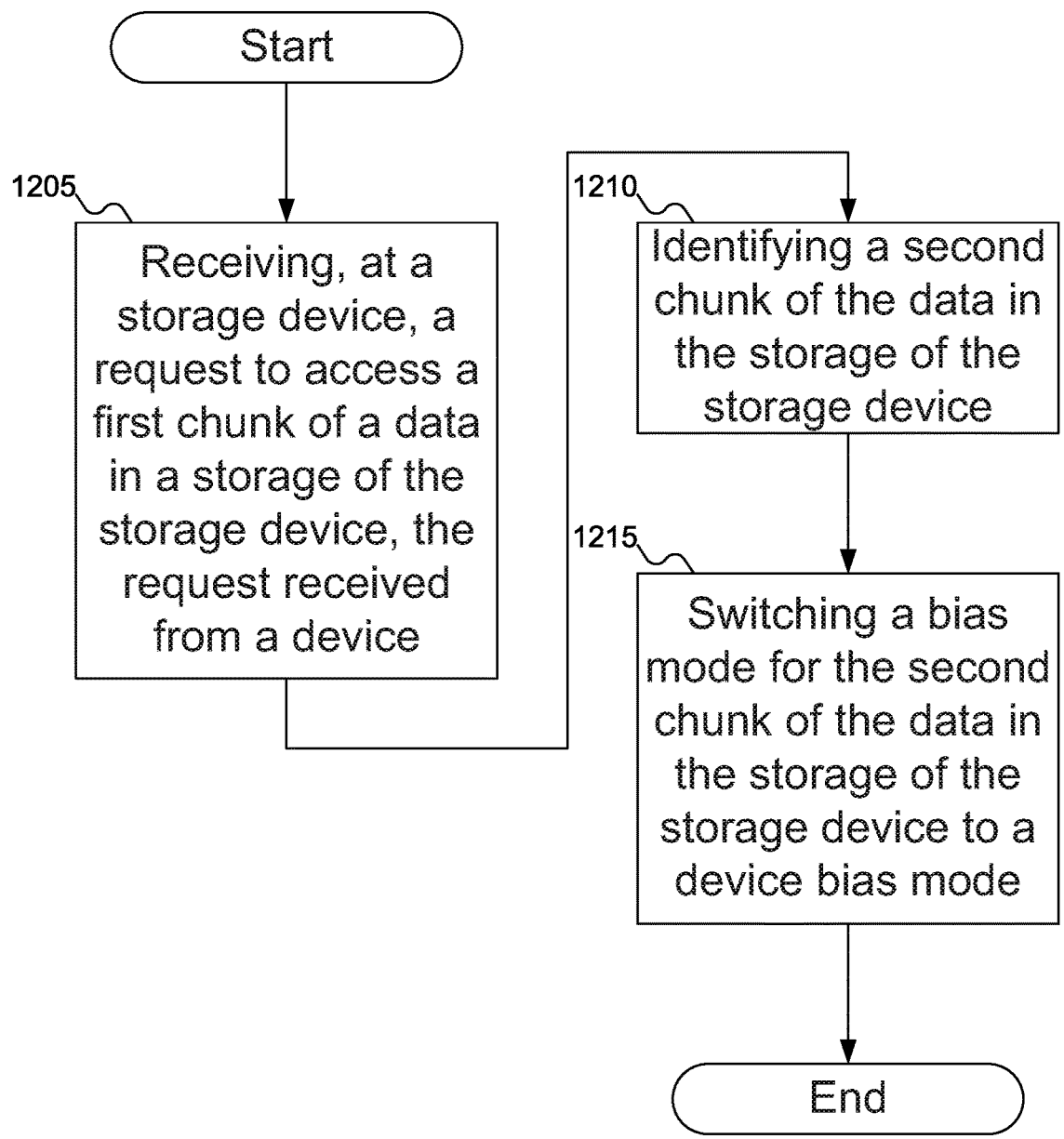
FIG. 12 shows a flowchart of an example procedure for the storage device of FIG. 1 to perform bias mode switching of pages in a region, according to embodiments of the disclosure.

FIG. 12 shows a flowchart of an example procedure for storage device 120 of FIG. 1 to perform bias mode switching of pages in a region, according to embodiments of the disclosure. In FIG. 12, at block 1205, storage device 120 of FIG. 1 may receive a request from device 135 of FIG. 1 to access a chunk of data. At block 1210, mechanism 340 of FIG. 3 may identify a second chunk of data in storage device 120 of FIG. 1. The first and second chunks may be part of a region, and may be contiguous: that is, the first and second chunks may share a common border or be touching. At block 1215, mechanism 340 of FIG. 3 may switch the bias mode of the second chunk to device bias mode, in expectation that device 135 of FIG. 1 may want to access the second chunk as well.

Figure 13:
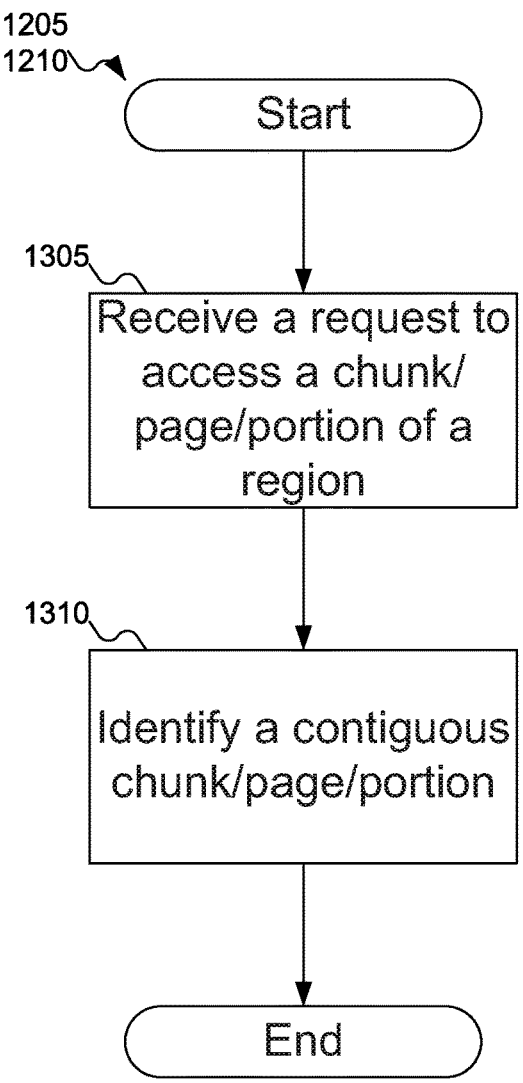
FIG. 13 shows a flowchart of an example procedure for the storage device of FIG. 1 to identify a page in a region for bias mode switching, according to embodiments of the disclosure.

FIG. 13 shows a flowchart of an example procedure for storage device 120 of FIG. 1 to identify a page in a region for bias mode switching, according to embodiments of the disclosure. In FIG. 13, at block 1305, storage device 120 of FIG. 1 may receive a request to access a chunk of data in a region. This chunk may be a cache line, a page, a block, a superblock, or any other defined portion of the region. At block 1310, mechanism 340 of FIG. 3 may identify a second chunk that is contiguous to the first chunk, so that the second chunk may be switched to device bias mode to expediate the expected access by device 135 of FIG. 1.

Figure 14:
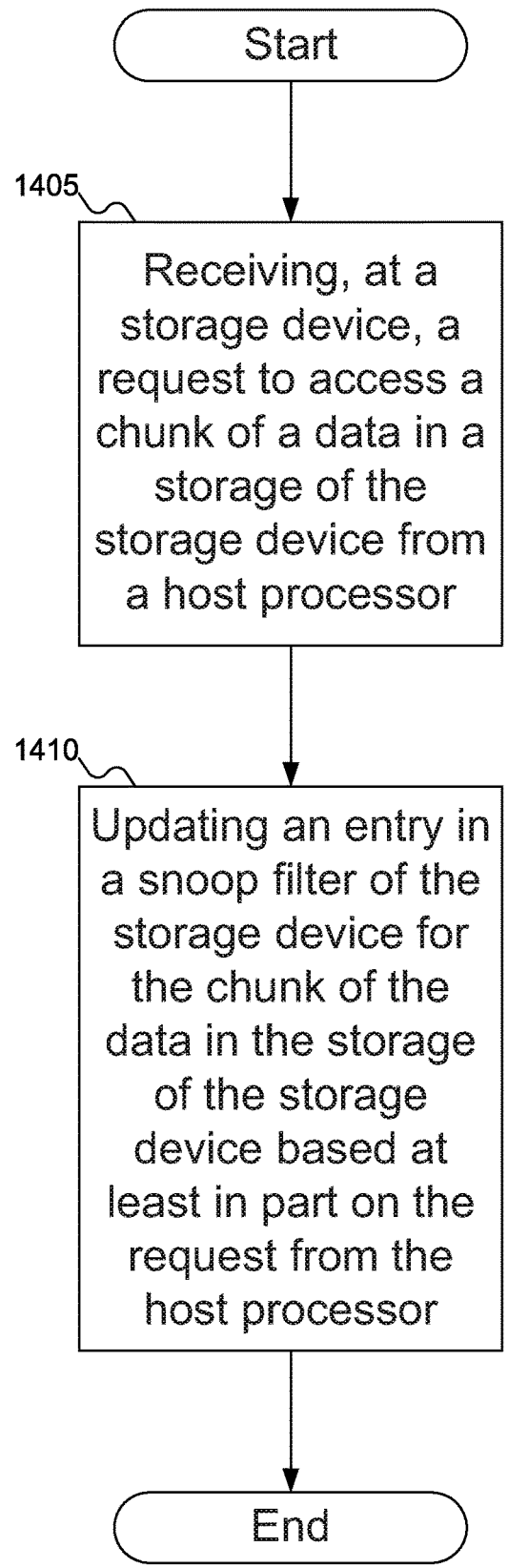
FIG. 14 shows a flowchart of an example procedure for the storage device of FIG. 1 to manage the snoop filter of FIG. 8, according to embodiments of the disclosure.

FIG. 14 shows a flowchart of an example procedure for storage device 120 of FIG. 1 to manage snoop filter 725 of FIG. 8, according to embodiments of the disclosure. In FIG. 14, at block 1405, storage device 120 of FIG. 1 may receive a request to access a chunk of data from processor 110 of FIG. 1. At block 1410, mechanism 340 of FIG. 3 may update snoop filter 725 of FIG. 7 to reflect the requested access by processor 110 of FIG. 1 to the chunk of data.

Figure 15:
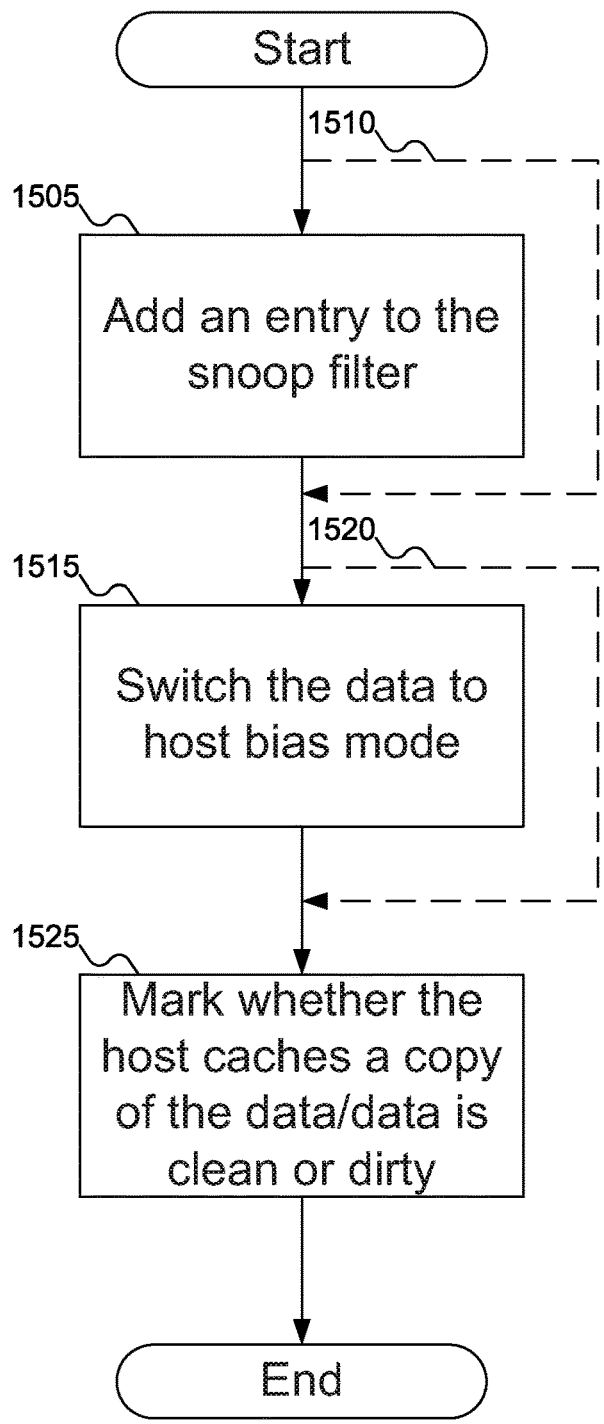
FIG. 15 shows a flowchart of an example procedure for the storage device of FIG. 1 to update an entry in the snoop filter of FIG. 8, according to embodiments of the disclosure.

FIG. 15 shows a flowchart of an example procedure for storage device 120 of FIG. 1 to update an entry in snoop filter 725 of FIG. 8, according to embodiments of the disclosure. FIG. 15 may represent the operations performed when host 105 of FIG. 1 requests access to data to which access has not been requested before, to which access has not been requested in a while, or for which host 105 of FIG. 1 has previously indicated is no longer being cached by host 105 of FIG. 1.

In FIG. 15, at block 1505, snoop filter cache controller 720 of FIG. 7 may add entry 815 of FIG. 8 to snoop filter 725 of FIG. 7. Block 1505 may occur if snoop filter 725 of FIG. 7 does not already include entry 815 of FIG. 8 for the chunk in question: if snoop filter 725 of FIG. 7 already includes entry 815 of FIG. 8 for the chunk in question, block 1505 may be skipped, as shown by dashed line 1510. At block 1515, snoop filter cache controller 720 of FIG. 7 may switch the chunk of data in storage device 120 of FIG. 1 to host bias mode. If the chunk of data in storage device 120 of FIG. 1 is already in host bias mode, then block 1515 may be skipped, as shown by dashed line 1520. Finally, at block 1520, snoop filter cache controller 720 of FIG. 7 may set cached 805 of FIG. 8 and/or clean 810 of FIG. 8 to indicate whether host 105 of FIG. 1 is now caching the chunk of data in question and/or whether host 105 of FIG. 1 has modified (or will modify) the data.

Figure 16:
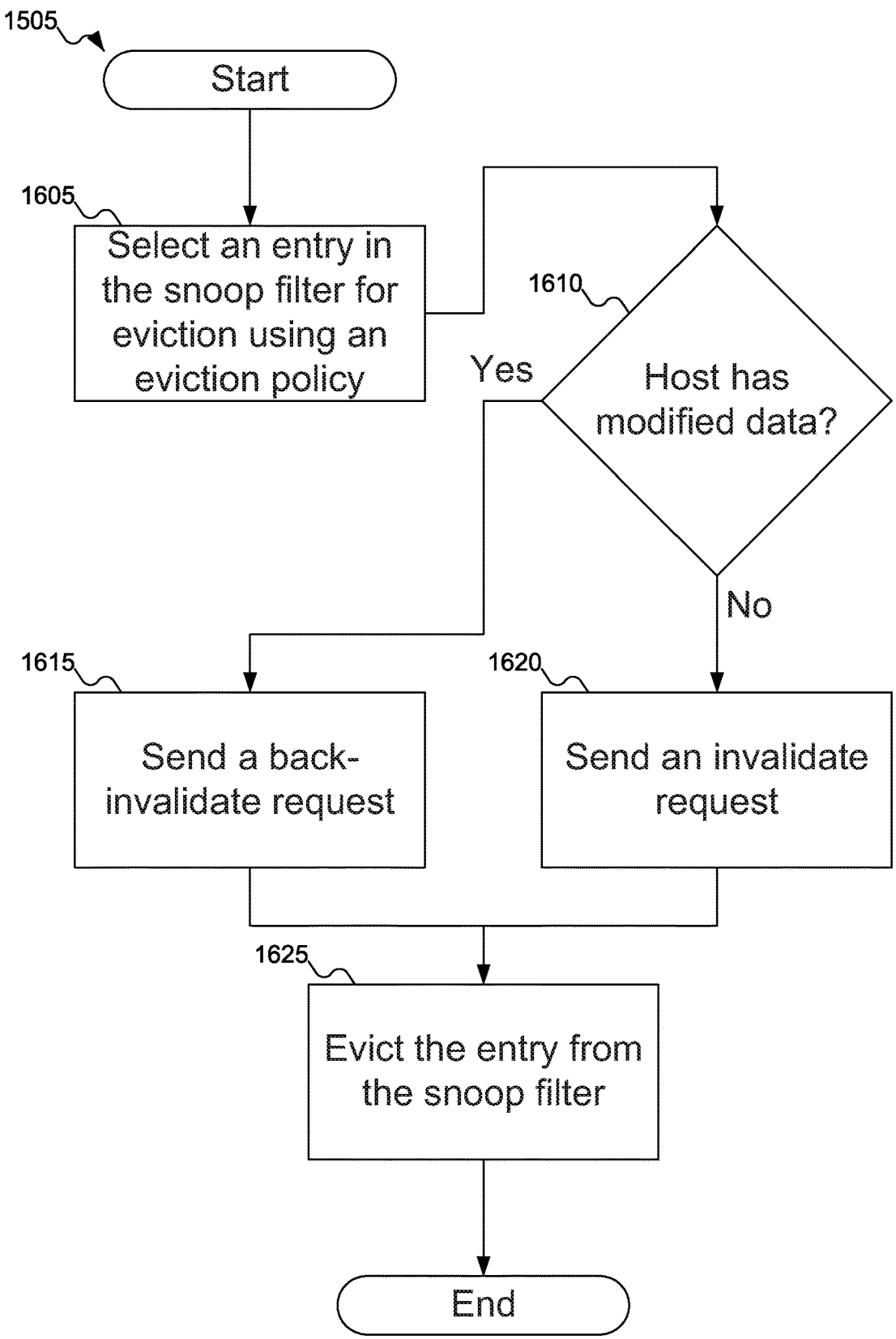
FIG. 16 shows a flowchart of an example procedure for the storage device of FIG. 1 to evict an entry from the snoop filter of FIG. 8, according to embodiments of the disclosure.

FIG. 16 shows a flowchart of an example procedure for storage device 120 of FIG. 1 to evict an entry from snoop filter 725 of FIG. 8, according to embodiments of the disclosure. In some embodiments of the disclosure, the example procedure shown in FIG. 16 may be utilized when snoop filter 725 of FIG. 7 is full (that is, snoop filter cache controller 720 of FIG. 7 wants to add an entry 815 of FIG. 8 to snoop filter 725 of FIG. 7, but there are no free entries 815 of FIG. 8 in snoop filter 725 of FIG. 7); in other embodiments of the disclosure, the example procedure shown in FIG. 16 may be utilized whenever snoop filter cache controller 720 of FIG. 7 wants to evict entry 815 of FIG. 8 from snoop filter 725 of FIG. 7, even if snoop filter 725 of FIG. 7 currently has some available entries 815 of FIG. 8.

In FIG. 16, at block 1605, snoop filter cache controller 720 of FIG. 7 may select entry 815 of FIG. 8 in snoop filter 725 of FIG. 7 for eviction. Snoop filter cache controller 720 of FIG. 7 may select entry 815 of FIG. 8 for eviction using any desired eviction policy: for example, a least recently used (LRU) policy, a least frequently used (LFU) policy, or any other desired eviction policy. At block 1610, snoop filter cache controller 720 of FIG. 7 may determine whether host 105 of FIG. 1 has modified the chunk of data, which may be determined from clean 810 of FIG. 8. If host 105 of FIG. 1 has modified the data, then at block 1615 snoop filter cache controller 720 of FIG. 7 may send a back-invalidate request to have host 105 of FIG. 1 send the updated data back to storage device 120 of FIG. 1. If host 105 of FIG. 1 has not modified the data, then at block 1620 snoop filter cache controller 720 of FIG. 7 may send an invalidate request to have host 105 of FIG. 1 delete any cached copy of the chunk of data (which may not be current any more). Finally, at block 1625, snoop filter cache controller 720 of FIG. 7 may evict entry 815 of FIG. 8 from snoop filter 725 of FIG. 7.

Implicit in blocks 1610, 1615, and 1620 is that the chunk of data in storage device 120 of FIG. 1 is in host bias mode and host 105 of FIG. 1 has at least cached a copy of the chunk of data from storage device 120 of FIG. 1, which may be determined from cached 805 of FIG. 8. If the chunk of data in storage device 120 of FIG. 1 is in device bias mode, then host 105 is not caching the chunk of data, let alone modifying the chunk of data, and blocks 1610, 1615, and 1620 may be skipped. Similarly, even if the chunk of data in storage device 120 of FIG. 1 is in host bias mode, if host 105 of FIG. 1 is not caching the chunk of data, then host 105 of FIG. 1 may not be modifying the data either, and blocks 1610, 1615, and 1620 may be skipped.

Figure 17:
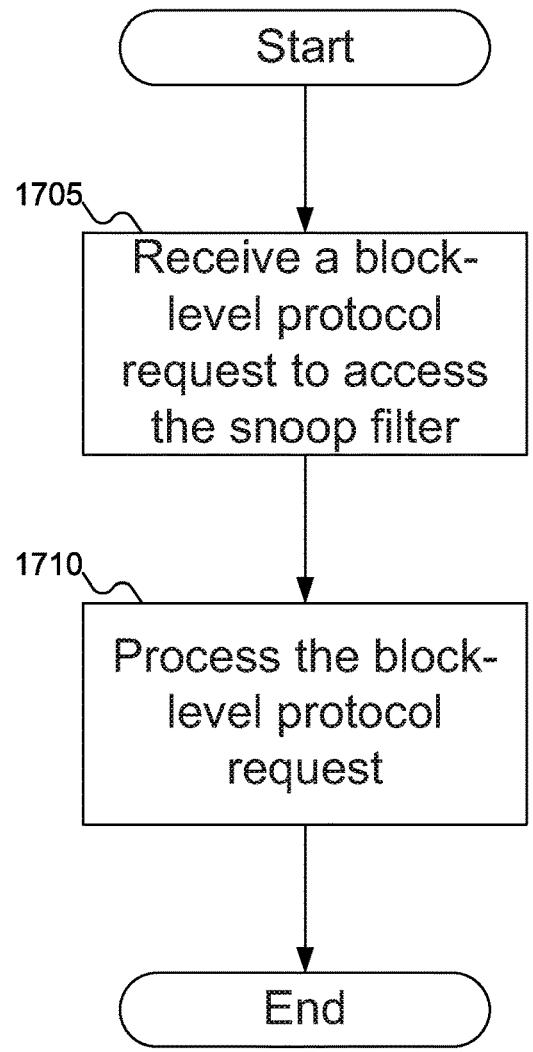
FIG. 17 shows a flowchart of an example procedure for the storage device of FIG. 1 to process an administrative access to the snoop filter of FIG. 8, according to embodiments of the disclosure.

FIG. 17 shows a flowchart of an example procedure for storage device 120 of FIG. 1 to process an administrative access to snoop filter 725 of FIG. 8, according to embodiments of the disclosure. In FIG. 17, at block 1705, snoop filter cache controller 720 of FIG. 7 may receive a block-level protocol to access snoop filter 725. For example, this block-level protocol request may be issued as a CXL.io request. Finally, at block 1710, snoop filter cache controller 720 of FIG. 7 may process the block-level protocol request. Examples of such requests may include inquiries regarding the number of entries 815 of FIG. 8 in snoop filter 725 of FIG. 7, whether snoop filter 725 of FIG. 7 includes entry 815 of FIG. 8 for a particular chunk of data, to evict entry 815 of FIG. 8 from snoop filter 725 of FIG. 7, or to reset some information in entries 815 of FIG. 8 in snoop filter 725 of FIG. 7.

In FIGS. 9-17, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

FIGS. 4-17 above describe various embodiments of the disclosure. These embodiments of the disclosure may be used individually or in combinations. For example, snoop filter 725 of FIG. 8 may be used in combination with the look-ahead bias mode switching described with reference to FIGS. 6 and 12-13 above, to determine which pages may simply be invalidated and which pages may be back-invalidated before the device may process the data thereon.

Embodiments of the disclosure may include a mechanism for managing bias mode for data in a storage device. The mechanism may include a bias score table to track bias scores for chunks of data, and may switch bias mode for a chunk of data when the bias scores reaches an appropriate threshold. Or the mechanism may determine when a device is accessing chunks of data in a region, and may start changing the bias mode for other chunks of data in the region in the background to expediate access to the data by the device. Or the mechanism may include a snoop filter that may track which chunks of data have been cached by the host processor, and which chunks of data are being modified by the host processor. The snoop filter may then request that the host processor invalidate or back-invalidate data from the cache of the host processor if a chunk is evicted from the snoop filter. Embodiments of the disclosure offer a technical advantage by expediting the transition from host bias mode to device bias mode (or vice versa) based on how data is being accessed from the storage device.

In a Compute Express Link (CXL) Type 2 device with a coherence protocol between the host and the accelerator device, two bias modes are defined for shared memory address. When memory is in host bias mode, the host is in charge of coherence and the device may inquire status before accessing this memory. Host bias mode favors host access even though the memory may be physically on either the device or the host. In device bias mode, the device is in charge of its coherence state, and the memory may change to host bias mode after the host accesses this memory. Device bias mode may enable fast access of the device from the accelerator without involving the host's attention. Depending on data processing, the shared address may start in host bias mode but change to device bias mode for acceleration and then change back to host bias mode once acceleration has completed. When changing from host bias mode to device bias mode, the CPU cache may be invalidated to keep data coherency.

Cache invalidation may have a negative effect on overall performance. Efficient cache invalidation may be relevant.

The CXL protocol may define the concept of bias of memory but does not define a particular method to manage bias. Details of managing bias—granularity of bias table entry, mechanism of bias mode switching, or the use case of bias mode in a real acceleration framework—are left to the manufacturer's implementation.

Bias mode switch may include an overhead to the overall coherency protocol. For different application the access pattern and the memory management granularity may vary. For example, for a large address range that is to be switched from host bias to device bias, flooding the host CPU with invalidation requests around the same time may affect other operations being performed by the CPU at that time. Further, blindly invalidating an entire address range may not be necessary if the device knows which lines are cached.

Here, three methods are presented and they can be used for different scenarios.

1) Hardware Speculative Bias Switch Based on Locality Counter.

In additional to a basic bias bit per approximately 4 KB page in the bias table, extra statistics may be kept to track host and device access. These statistics may represent how many times this memory page is accessed by either host or device. If access meets a threshold, switching the bias of that hot data to favor its users may reduce overall access overhead. This approach is a generic page flipping mechanism.

2) Background Bias Switching when Flipping a Sequential Region.

When a region is accessed sequentially that may involving switching between host bias and device bias, the bias switching may happen in the background after some initial pages. This background bias switching may improve the latency for device applications to start earlier rather than waiting for the entire region to be switched from host bias to device bias. This method may offer improved performance for sequential access of a large memory region in one operation.

3) Selective Bias Switching with Snoop Filter

When issuing an invalidation when switching from host bias to device bias, the number of invalidated cache lines may have a large impact on CPU performance. Having a snoop filter track which lines that are in the CPU cache may enable the device to flush data more precisely and may avoid unnecessary over-flushing. This method may offer improved performance when data sharing is minimal between the host and the acceleration device.

Bias switching may be performed per cache line (approximately 64 B), per host-managed device memory (HDM) page (approximately 4 KB), or per region (multiple pages).

A device may operate properly in host bias mode. But host bias may require device memory accesses to be looked up remotely at the host cache(s). Accessing a host cache may take a significant amount of time, slowing device access to the memory. On the other hand, while device bias has improved latency for device access to the memory, device bias may result in corrupted coherent states.

Bias switching may ensure that cache coherency is followed to prevent any data inconsistency between the device HDM data and host memory data. Before switching from host bias to device bias, the device may send invalidate requests to the host to ensure that host caches contain no device memory.

Score-based bias switching is a hardware assisted method where hardware may predict what is the best bias mode for the next device memory access. Each page may have a 4-bit indicator: Bit[0] may identify the bias mode (for example, 0: host bias; 1: device bias); Bit [3:1] may store the bias score (default value=0 after a change of bias mode).

Each time the host accesses the page, the score may be incremented by 1. Each time the device accesses the page, the score may be decremented by 1. If the score reaches the maximum positive value (determined by some threshold) and the device was in device bias mode, the bias mode may be switched to host bias mode. If the score reaches the maximum negative value (determined by some threshold) and the device was in host bias mode, the bias mode may be switched to device bias mode.

Some applications (e.g., database accelerators) may involve switching bias on a whole region, which may include thousands of contiguous (or non-contiguous) pages. Bias switching of a page may involve the device invalidating the host cache(s) of cache lines belonging to that page before the page may be safely switched from host bias to device bias mode.

If multiple contiguous pages are to be switch their biases, while the device engine is operating on the current page (on device bias mode), bias switching may look ahead and start sending invalidation requests in anticipation of switching bias on the next page. The task of preparing the page to safely switch from host bias to device bias may be done mostly in the back ground without the potential penalty for page invalidation.

In a brute force hardware method, the device may send out invalidate/back-invalidate requests for every cache line on the page that is about to be subject to bias switching. A fine grain control Snoop Filter on the device ,may track of all cache lines that have been accessed by the host, and only send out invalidations on those affected cache lines (rather than the entire page). A fixed size snoop filter directory (e.g., 1 million cache lines) may be implemented using a private region of the Dynamic Random Access Memory (DRAM) with a fast access on-chip snoop filter cache.

The snoop filter may implement a data structure and a replacement algorithm where a new cache line may replace an existing cache line. The device may send an invalidate request for the replaced cache line.

To ensure switch from host bias to device bias functions properly, all shared cache lines resident in host cache(s) may be invalidated, or back invalidated prior to bias flipping.

For some specific applications, a device might only send out invalidate requests to the host since the accelerator's output regions may start out fresh.

Invalidate policy: The device may send out an Invalidate request to the host for any shared copies.

Back-Invalidate policy: The device may send out a Read-to-Own request (to invalidate the cache line and obtain the latest data) followed by a Writeback to the device-attached regions on dirty copies.

A smaller directed map snoop filter cache (e.g., approximately 256 KB) may be implemented to take advantages of the sequential access nature of the affect region.

When the snoop filter is full, a replacement algorithm may select an existing line to be evicted (by sending the invalidate/back invalidate request to the host) to make space for the new line to be installed.

A hardware engine may read the snoop filter entries from the on-chip cache, send a back-invalidate request to the host, and prefetch new data from DRAM, all of which may be done approximately simultaneously.

Supporting hooks for software-initiated bias mode flipping may include: control and status register (CSR) diagnostic read/write access to the snoop filter directory, software-initiated back-invalidation start, and hardware-control back-invalidation completion. CSR registers may be used, for example, to log errors, to set up parameters for request operations, and to provide diagnostic access to the device.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a
storage device, comprising:
a storage for a data;
a controller to manage access to the data in the storage; and
a mechanism to automatically manage a bias mode for a chunk of the data in the storage, the bias mode including one of a host bias mode and a device bias mode.

Statement 2. An embodiment of the disclosure includes the storage device according to statement 1, wherein the storage device supports a cache coherent interconnect protocol.

Statement 3. An embodiment of the disclosure includes the storage device according to statement 2, wherein the cache coherent interconnect protocol includes a Compute Express Link (CXL) protocol.

Statement 4. An embodiment of the disclosure includes the storage device according to statement 1, wherein the mechanism to automatically manage the bias mode for the chunk of the data in the storage is configured to issue one of an invalidate request or a back invalidate request to a host processor for the chunk of the data in the storage based at least in part on the bias mode for the chunk of the data in the storage being switched to the device bias mode.

Statement 5. An embodiment of the disclosure includes the storage device according to statement 1, wherein the chunk of the data in the storage includes a size.

Statement 6. An embodiment of the disclosure includes the storage device according to statement 5, wherein the size of the chunk of the data in the storage includes 4 kilobytes.

Statement 7. An embodiment of the disclosure includes the storage device according to statement 1, wherein the mechanism to automatically manage the bias mode for the chunk of the data in the storage includes a bias score for the chunk of the data in the storage.

Statement 8. An embodiment of the disclosure includes the storage device according to statement 7, wherein the mechanism to automatically manage the bias mode for the chunk of the data in the storage is configured to adjust the bias score for the chunk of the data in the storage based at least in part on an access of the chunk of the data in the storage by one of a device or a host processor.

Statement 9. An embodiment of the disclosure includes the storage device according to statement 8, wherein the storage device includes the device.

Statement 10. An embodiment of the disclosure includes the storage device according to statement 8, wherein the device includes an accelerator.

Statement 11. An embodiment of the disclosure includes the storage device according to statement 7, wherein the mechanism to automatically manage the bias mode for the chunk of the data in the storage is configured to change the bias mode for the chunk of the data in the storage to the host bias mode based at least in part on the bias score reaching a first threshold, and to change the bias mode for the chunk of the data in the storage to the device bias mode based at least in part on the bias score reaching a second threshold.

Statement 12. An embodiment of the disclosure includes the storage device according to statement 7, wherein the mechanism to automatically manage the bias mode for the chunk of the data in the storage further includes the bias mode for the chunk of the data in the storage.

Statement 13. An embodiment of the disclosure includes the storage device according to statement 7, wherein the mechanism to automatically manage the bias mode for the chunk of the data in the storage is configured to set the bias score to a default value at a reset.

Statement 14. An embodiment of the disclosure includes the storage device according to statement 13, wherein the default value for the bias score includes a zero value.

Statement 15. An embodiment of the disclosure includes the storage device according to statement 7, wherein the mechanism to automatically manage the bias mode for the chunk of the data in the storage is configured to receive a reset request for the bias score for the chunk of the data in the storage.

Statement 16. An embodiment of the disclosure includes the storage device according to statement 15, wherein the mechanism to automatically manage the bias mode for the chunk of the data in the storage is configured to receive the reset request for the bias score for the chunk of the data in the storage from an application.

Statement 17. An embodiment of the disclosure includes the storage device according to statement 7, further comprising a second storage for the bias score for the chunk of the data in the storage.

Statement 18. An embodiment of the disclosure includes the storage device according to statement 17, wherein the storage includes the second storage.

Statement 19. An embodiment of the disclosure includes the storage device according to statement 1, wherein the mechanism to automatically manage the bias mode for the chunk of the data in the storage is configured to automatically manage the bias mode for the chunk of the data in the storage based at least in part on a device accessing a second chunk of the data in the storage.

Statement 20. An embodiment of the disclosure includes the storage device according to statement 19, wherein the storage device includes the device.

Statement 21. An embodiment of the disclosure includes the storage device according to statement 19, wherein the device includes an accelerator.

Statement 22. An embodiment of the disclosure includes the storage device according to statement 19, wherein the mechanism to automatically manage the bias mode for the chunk of the data in the storage is configured to automatically manage the bias mode for the chunk of the data in the storage based at least in part on the device requesting the device bias mode for the second chunk of the data in the storage.

Statement 23. An embodiment of the disclosure includes the storage device according to statement 19, wherein:
the second chunk of the data in the storage includes a first page;
the chunk of the data in the storage includes a second page; and
the mechanism to automatically manage the bias mode for the chunk of the data in the storage is configured to automatically manage the bias mode for the chunk of the data in the storage based at least in part on the fact that the second page is contiguous to the first page.

Statement 24. An embodiment of the disclosure includes the storage device according to statement 19, wherein:
the second chunk of the data in the storage includes a first portion of a region of the data in the storage;
the chunk of the data in the storage includes a second portion of the region of the data in the storage; and
the mechanism to automatically manage the bias mode for the chunk of the data in the storage is configured to automatically manage the bias mode for the chunk of the data in the storage based at least in part on the fact that the first portion of the region and the second portion of the region are both part of the region.

Statement 25. An embodiment of the disclosure includes the storage device according to statement 19, wherein the mechanism to automatically manage the bias mode for the chunk of the data in the storage is configured to automatically manage the bias mode for the chunk of the data in the storage in expectation of the device accessing the chunk of the data in the storage.

Statement 26. An embodiment of the disclosure includes the storage device according to statement 25, wherein the mechanism to automatically manage the bias mode for the chunk of the data in the storage is configured to automatically manage the bias mode for the chunk of the data in the storage before the device accesses the chunk of the data in the storage.

Statement 27. An embodiment of the disclosure includes the storage device according to statement 19, wherein the device is configured to access the chunk of the data in the storage before the second chunk of the data in the storage is in the device bias mode.

Statement 28. An embodiment of the disclosure includes the storage device according to statement 19, wherein the mechanism to automatically manage the bias mode for the chunk of the data in the storage is configured to automatically manage the bias mode for the chunk of the data in the storage as a background operation of the storage device.

Statement 29. An embodiment of the disclosure includes the storage device according to statement 1, wherein the mechanism to automatically manage the bias mode for the chunk of the data in the storage includes a snoop filter including an entry for the chunk of the data in the storage as accessed by a host processor.

Statement 30. An embodiment of the disclosure includes the storage device according to statement 29, wherein the entry for the chunk of the data in the storage identifies that the chunk of the data in the storage is unmodified by the host processor.

Statement 31. An embodiment of the disclosure includes the storage device according to statement 30, wherein the mechanism to automatically manage the bias mode for the chunk of the data in the storage is configured to update the entry for the chunk of the data in the storage as read by the host processor based at least in part on the host processor accessing the chunk of the data in the storage.

Statement 32. An embodiment of the disclosure includes the storage device according to statement 30, wherein the mechanism to automatically manage the bias mode for the chunk of the data in the storage is configured to invalidate the chunk of the data in the storage from a cache of the host processor based at least in part on the snoop filter evicting the entry for the chunk of the data in the storage.

Statement 33. An embodiment of the disclosure includes the storage device according to statement 29, wherein the entry for the chunk of the data in the storage identifies that the chunk of the data in the storage is modified by the host processor.

Statement 34. An embodiment of the disclosure includes the storage device according to statement 33, wherein the mechanism to automatically manage the bias mode for the chunk of the data in the storage is configured to update the entry for the chunk of the data in the storage as modified by the host processor based at least in part on the host processor accessing the chunk of the data in the storage.

Statement 35. An embodiment of the disclosure includes the storage device according to statement 33, wherein the mechanism to automatically manage the bias mode for the chunk of the data in the storage is configured to back-invalidate the chunk of the data in the storage from a cache of the host processor based at least in part on the snoop filter evicting the entry for the chunk of the data in the storage.

Statement 36. An embodiment of the disclosure includes the storage device according to statement 29, wherein the snoop filter includes an eviction policy.

Statement 37. An embodiment of the disclosure includes the storage device according to statement 36, wherein the eviction policy of the snoop filter is different from a second eviction policy of a cache of the host processor.

Statement 38. An embodiment of the disclosure includes the storage device according to statement 29, further comprising a second storage for the snoop filter.

Statement 39. An embodiment of the disclosure includes the storage device according to statement 38, wherein the second storage includes a dynamic random access memory (DRAM).

Statement 40. An embodiment of the disclosure includes the storage device according to statement 38, wherein the second storage includes one of a volatile second storage or a non-volatile second storage.

Statement 41. An embodiment of the disclosure includes the storage device according to statement 38, wherein:
the snoop filter includes a first portion and a second portion;
the second storage includes the first portion of the snoop filter; and
the storage includes the second portion of the snoop filter.

Statement 42. An embodiment of the disclosure includes the storage device according to statement 38, wherein the mechanism to automatically manage the bias mode for the chunk of the data in the storage further includes a snoop filter cache controller to manage the snoop filter.

Statement 43. An embodiment of the disclosure includes the storage device according to statement 42, wherein the snoop filter cache controller is configured to add the entry for the chunk of the data in the storage to the snoop filter, and to evict the entry for the chunk of the data in the storage from the snoop filter.

Statement 44. An embodiment of the disclosure includes the storage device according to statement 42, wherein the snoop filter cache controller is configured to issue an invalidate request or a back invalidate request to the host processor based at least in part on the entry for the chunk of the data in the storage being evicted from the snoop filter.

Statement 45. An embodiment of the disclosure includes the storage device according to statement 29, wherein the storage device supports a cache coherent interconnect protocol, the cache coherent interconnect protocol including a block-level protocol and a byte-level protocol, the block-level protocol supporting access to the snoop filter.

Statement 46. An embodiment of the disclosure includes the storage device according to statement 45, wherein block-level protocol supports access to the snoop filter by an application.

Statement 47. An embodiment of the disclosure includes a method, comprising:
receiving, at a storage device, a request to access a chunk of a data in a storage of the storage device, the request received from a source;

identifying a bias score for the chunk of the data in the storage of the storage device; and adjusting the bias score for the chunk of the data in the storage of the storage device based at least in part on the source of the request.

Statement 48. An embodiment of the disclosure includes the method according to statement 47, wherein receiving, at the storage device, the request to access the chunk of the data in the storage of the storage device includes receiving, at the storage device, the request to access the chunk of the data in the storage of the storage device, the request received from a host processor.

Statement 49. An embodiment of the disclosure includes the method according to statement 48, wherein adjusting the bias score for the chunk of the data in the storage of the storage device based at least in part on the source of the request includes incrementing the bias score for the chunk of the data in the storage of the storage device based at least in part on the source including the host processor.

Statement 50. An embodiment of the disclosure includes the method according to statement 49, wherein incrementing the bias score for the chunk of the data in the storage of the storage device based at least in part on the source including the host processor includes determining a bias mode for the chunk of the data in the storage of the storage device includes a device bias mode.

Statement 51. An embodiment of the disclosure includes the method according to statement 50, further comprising switching the bias mode for the chunk of the data in the storage of the storage device to a host bias mode based at least in part on the chunk of the data in the storage of the storage device being in device bias mode.

Statement 52. An embodiment of the disclosure includes the method according to statement 49, further comprising switching the bias mode for the chunk of the data in the storage of the storage device to a host bias mode based at least in part on the bias score crossing a threshold.

Statement 53. An embodiment of the disclosure includes the method according to statement 49, wherein incrementing the bias score for the chunk of the data in the storage of the storage device based at least in part on the source including the host processor includes incrementing the bias score for the chunk of the data in the storage of the storage device based at least in part on the source including the host processor and the bias score being less than a threshold.

Statement 54. An embodiment of the disclosure includes the method according to statement 48, wherein adjusting the bias score for the chunk of the data in the storage of the storage device based at least in part on the source of the request includes:
determining a bias mode for the chunk of the data in the storage of the storage device includes a host bias mode; and
leaving the bias score for the chunk of the data in the storage of the storage device unchanged based at least in part on the source including the host processor and the bias mode including the host bias mode.

Statement 55. An embodiment of the disclosure includes the method according to statement 47, wherein receiving, at the storage device, the request to access the chunk of the data in the storage of the storage device includes receiving, at the storage device, the request to access the chunk of the data in the storage of the storage device, the request received from a device.

Statement 56. An embodiment of the disclosure includes the method according to statement 55, wherein the storage device includes the device.

Statement 57. An embodiment of the disclosure includes the method according to statement 55, wherein the device includes an accelerator.

Statement 58. An embodiment of the disclosure includes the method according to statement 55, wherein adjusting the bias score for the chunk of the data in the storage of the storage device based at least in part on the source of the request includes decrementing the bias score for the chunk of the data in the storage of the storage device based at least in part on the source including the device.

Statement 59. An embodiment of the disclosure includes the method according to statement 58, wherein decrementing the bias score for the chunk of the data in the storage of the storage device based at least in part on the source including the device includes determining a bias mode for the chunk of the data in the storage of the storage device includes a host bias mode.

Statement 60. An embodiment of the disclosure includes the method according to statement 59, further comprising switching the bias mode for the chunk of the data in the storage of the storage device to a device bias mode based at least in part on the chunk of the data in the storage of the storage device being in host bias mode.

Statement 61. An embodiment of the disclosure includes the method according to statement 58, further comprising switching the bias mode for the chunk of the data in the storage of the storage device to a device bias mode based at least in part on the bias score crossing a threshold.

Statement 62. An embodiment of the disclosure includes the method according to statement 58, wherein decrementing the bias score for the chunk of the data in the storage of the storage device based at least in part on the source including the device includes decrementing the bias score for the chunk of the data in the storage of the storage device based at least in part on the source including the device and the bias score being greater than a threshold.

Statement 63. An embodiment of the disclosure includes the method according to statement 55, wherein adjusting the bias score for the chunk of the data in the storage of the storage device based at least in part on the source of the request includes:
determining a bias mode for the chunk of the data in the storage of the storage device includes a device bias mode; and
leaving the bias score for the chunk of the data in the storage of the storage device unchanged based at least in part on the source including the device and the bias mode including the device bias mode.

Statement 64. An embodiment of the disclosure includes a method, comprising:
receiving, at a storage device, a request to access a first chunk of a data in a storage of the storage device, the request received from a device;
identifying a second chunk of the data in the storage of the storage device; and
switching a bias mode for the second chunk of the data in the storage of the storage device to a device bias mode.

Statement 65. An embodiment of the disclosure includes the method according to statement 64, wherein the storage device includes the device.

Statement 66. An embodiment of the disclosure includes the method according to statement 64, wherein the device includes an accelerator.

Statement 67. An embodiment of the disclosure includes the method according to statement 64, wherein the request includes a bias request to switch the bias mode for the first chunk of the data in the storage of the storage device to the device bias mode.

Statement 68. An embodiment of the disclosure includes the method according to statement 64, wherein:
receiving, at the storage device, the request to access the first chunk of the data in the storage of the storage device includes receiving, at the storage device, the request to access a first page of the data in the storage of the storage device;
identifying the second chunk of the data in the storage of the storage device includes identifying a second page of the data in the storage of the storage device.

Statement 69. An embodiment of the disclosure includes the method according to statement 68, wherein identifying the second page of the data in the storage of the storage device includes identifying the second page of the data in the storage of the storage device as contiguous with the first page of the data in the storage of the storage device.

Statement 70. An embodiment of the disclosure includes the method according to statement 64, wherein:
receiving, at the storage device, the request to access the first chunk of the data in the storage of the storage device includes receiving, at the storage device, the request to access a first portion of a region of the data in the storage of the storage device;
identifying the second chunk of the data in the storage of the storage device includes identifying a second portion of the region of the data in the storage of the storage device.

Statement 71. An embodiment of the disclosure includes the method according to statement 70, wherein identifying the second portion of the region of the data in the storage of the storage device includes identifying the second portion of the region of the data in the storage of the storage device as contiguous with the first portion of the region of the data in the storage of the storage device.

Statement 72. An embodiment of the disclosure includes the method according to statement 64, wherein switching the bias mode for the second chunk of the data in the storage of the storage device to a device bias mode includes switching the bias mode for the second chunk of the data in the storage of the storage device to a device bias mode in expectation of the device accessing the second chunk of the data in the storage of the storage device.

Statement 73. An embodiment of the disclosure includes the method according to statement 64, wherein the device is configured to access the first chunk of the data in the storage of the storage device before second chunk of the data in the storage of the storage device is in the device bias mode.

Statement 74. An embodiment of the disclosure includes the method according to statement 64, wherein switching the bias mode for the second chunk of the data in the storage of the storage device to a device bias mode includes switching the bias mode for the second chunk of the data in the storage of the storage device to a device bias mode as a background operation of the storage device.

Statement 75. An embodiment of the disclosure includes a method, comprising:
receiving, at a storage device, a request to access a chunk of a data in a storage of the storage device from a host processor; and
updating an entry in a snoop filter of the storage device for the chunk of the data in the storage of the storage device based at least in part on the request from the host processor.

Statement 76. An embodiment of the disclosure includes the method according to statement 75, wherein the snoop filter is stored in a second storage of the storage device.

Statement 77. An embodiment of the disclosure includes the method according to statement 76, wherein the second storage of the storage device includes a dynamic random access memory (DRAM).

Statement 78. An embodiment of the disclosure includes the method according to statement 76, wherein the second storage includes one of a volatile second storage or a non-volatile second storage.

Statement 79. An embodiment of the disclosure includes the method according to statement 76, wherein:
the snoop filter includes a first portion and a second portion;
the second storage of the storage device includes the first portion of the snoop filter; and
the storage of the storage device includes the second portion of the snoop filter.

Statement 80. An embodiment of the disclosure includes the method according to statement 75, wherein updating the entry in the snoop filter of the storage device for the chunk of the data in the storage of the storage device based at least in part on the request from the host processor includes adding the entry in the snoop filter of the storage device for the chunk of the data in the storage of the storage device based at least in part on the snoop filter not including the entry for the chunk of the data in the storage of the storage device.

Statement 81. An embodiment of the disclosure includes the method according to statement 80, wherein updating the entry in the snoop filter of the storage device for the chunk of the data in the storage of the storage device based at least in part on the request from the host processor further includes switching a bias mode for the chunk of the data in the storage of the storage device to a host bias mode.

Statement 82. An embodiment of the disclosure includes the method according to statement 75, wherein the request includes an identifier that the host processor does not intend to modify the chunk of the data in the storage of the storage device.

Statement 83. An embodiment of the disclosure includes the method according to statement 82, wherein updating the entry in the snoop filter of the storage device for the chunk of the data in the storage of the storage device based at least in part on the request from the host processor includes updating the entry in the snoop filter of the storage of the storage device that the chunk of the data in the storage of the storage device is unmodified by the host processor.

Statement 84. An embodiment of the disclosure includes the method according to statement 75, wherein the request includes an identifier that the host processor intends to modify the chunk of the data in the storage of the storage device.

Statement 85. An embodiment of the disclosure includes the method according to statement 84, wherein updating the entry in the snoop filter of the storage device for the chunk of the data in the storage of the storage device based at least in part on the request from the host processor includes updating the entry in the snoop filter of the storage of the storage device that the chunk of the data in the storage of the storage device is modified by the host processor.

Statement 86. An embodiment of the disclosure includes the method according to statement 75, further comprising evicting the entry in the snoop filter of the storage device.

Statement 87. An embodiment of the disclosure includes the method according to statement 86, wherein evicting the entry in the snoop filter of the storage device includes evicting the entry in the snoop filter of the storage device based at least in part on an eviction policy of the snoop filter.

Statement 88. An embodiment of the disclosure includes the method according to statement 87, wherein the eviction policy of the snoop filter is different from a second eviction policy of a cache of the host processor.

Statement 89. An embodiment of the disclosure includes the method according to statement 86, wherein evicting the entry in the snoop filter of the storage device includes sending an invalidate request for the chunk of the data in the storage of the storage device form the storage device to the host processor.

Statement 90. An embodiment of the disclosure includes the method according to statement 89, wherein sending the invalidate request for the chunk of the data in the storage of the storage device form the storage device to the host processor includes sending the invalidate request for the chunk of the data in the storage of the storage device form the storage device to the host processor based at least in part on the entry in the snoop filter for the chunk of the data in the storage of the storage device indicating that the chunk of the data in the storage of the storage device is unmodified by the host processor.

Statement 91. An embodiment of the disclosure includes the method according to statement 86, wherein evicting the entry in the snoop filter of the storage device includes sending a back-invalidate request for the chunk of the data in the storage of the storage device form the storage device to the host processor.

Statement 92. An embodiment of the disclosure includes the method according to statement 91, wherein sending the back-invalidate request for the chunk of the data in the storage of the storage device form the storage device to the host processor includes sending the back-invalidate request for the chunk of the data in the storage of the storage device form the storage device to the host processor based at least in part on the entry in the snoop filter for the chunk of the data in the storage of the storage device indicating that the chunk of the data in the storage of the storage device is modified by the host processor.

Statement 93. An embodiment of the disclosure includes the method according to statement 75, further comprising:
  receiving, at the storage device, a block-level protocol request to access the snoop filter; and
  processing the block-level protocol request,
    wherein the storage device supports a cache coherent interconnect protocol, the cache coherent interconnect protocol including the block-level protocol and a byte-level protocol.

Statement 94. An embodiment of the disclosure includes an article, comprising a non-transitory storage medium, the non-transitory storage medium having stored thereon instructions that, when executed by a machine, result in:
  receiving, at a storage device, a request to access a chunk of a data in a storage of the storage device, the request received from a source;
  identifying a bias score for the chunk of the data in the storage of the storage device; and
  adjusting the bias score for the chunk of the data in the storage of the storage device based at least in part on the source of the request.

Statement 95. An embodiment of the disclosure includes the article according to statement 94, wherein receiving, at the storage device, the request to access the chunk of the data in the storage of the storage device includes receiving, at the storage device, the request to access the chunk of the data in the storage of the storage device, the request received from a host processor.

Statement 96. An embodiment of the disclosure includes the article according to statement 95, wherein adjusting the bias score for the chunk of the data in the storage of the storage device based at least in part on the source of the request includes incrementing the bias score for the chunk of the data in the storage of the storage device based at least in part on the source including the host processor.

Statement 97. An embodiment of the disclosure includes the article according to statement 96, wherein incrementing the bias score for the chunk of the data in the storage of the storage device based at least in part on the source including the host processor includes determining a bias mode for the chunk of the data in the storage of the storage device includes a device bias mode.

Statement 98. An embodiment of the disclosure includes the article according to statement 97, wherein the non-transitory storage medium has stored thereon further instructions that, when executed by the machine, result in switching the bias mode for the chunk of the data in the storage of the storage device to a host bias mode.

Statement 99. An embodiment of the disclosure includes the article according to statement 98, wherein switching the bias mode for the chunk of the data in the storage of the storage device to a host bias mode includes switching the bias mode for the chunk of the data in the storage of the storage device to a host bias mode based at least in part on the bias score crossing a threshold.

Statement 100. An embodiment of the disclosure includes the article according to statement 96, wherein incrementing the bias score for the chunk of the data in the storage of the storage device based at least in part on the source including the host processor includes incrementing the bias score for the chunk of the data in the storage of the storage device based at least in part on the source including the host processor and the bias score being less than a threshold.

Statement 101. An embodiment of the disclosure includes the article according to statement 95, wherein adjusting the bias score for the chunk of the data in the storage of the storage device based at least in part on the source of the request includes:
  determining a bias mode for the chunk of the data in the storage of the storage device includes a host bias mode; and
  leaving the bias score for the chunk of the data in the storage of the storage device unchanged based at least in part on the source including the host processor and the bias mode including the host bias mode.

Statement 102. An embodiment of the disclosure includes the article according to statement 94, wherein receiving, at the storage device, the request to access the chunk of the data in the storage of the storage device includes receiving, at the storage device, the request to access the chunk of the data in the storage of the storage device, the request received from a device.

Statement 103. An embodiment of the disclosure includes the article according to statement 102, wherein the storage device includes the device.

Statement 104. An embodiment of the disclosure includes the article according to statement 102, wherein the device includes an accelerator.

Statement 105. An embodiment of the disclosure includes the article according to statement 102, wherein adjusting the bias score for the chunk of the data in the storage of the storage device based at least in part on the source of the request includes decrementing the bias score for the chunk of the data in the storage of the storage device based at least in part on the source including the device.

Statement 106. An embodiment of the disclosure includes the article according to statement 105, wherein decrementing the bias score for the chunk of the data in the storage of the storage device based at least in part on the source including the device includes determining a bias mode for the chunk of the data in the storage of the storage device includes a host bias mode.

Statement 107. An embodiment of the disclosure includes the article according to statement 106, wherein the non-transitory storage medium has stored thereon further instructions that, when executed by the machine, result in switching the bias mode for the chunk of the data in the storage of the storage device to a device bias mode.

Statement 108. An embodiment of the disclosure includes the article according to statement 107, wherein switching the bias mode for the chunk of the data in the storage of the storage device to a device bias mode includes switching the bias mode for the chunk of the data in the storage of the storage device to a device bias mode based at least in part on the bias score crossing a threshold.

Statement 109. An embodiment of the disclosure includes the article according to statement 105, wherein decrementing the bias score for the chunk of the data in the storage of the storage device based at least in part on the source including the device includes decrementing the bias score for the chunk of the data in the storage of the storage device based at least in part on the source including the device and the bias score being greater than a threshold.

Statement 110. An embodiment of the disclosure includes the article according to statement 102, wherein adjusting the bias score for the chunk of the data in the storage of the storage device based at least in part on the source of the request includes:
  determining a bias mode for the chunk of the data in the storage of the storage device includes a device bias mode; and
  leaving the bias score for the chunk of the data in the storage of the storage device unchanged based at least in part on the source including the device and the bias mode including the device bias mode.

Statement 111. An embodiment of the disclosure includes an article, comprising:
  receiving, at a storage device, a request to access a first chunk of a data in a storage of the storage device, the request received from a device;
  identifying a second chunk of the data in the storage of the storage device; and
  switching a bias mode for the second chunk of the data in the storage of the storage device to a device bias mode.

Statement 112. An embodiment of the disclosure includes the article according to statement 111, wherein the storage device includes the device.

Statement 113. An embodiment of the disclosure includes the article according to statement 111, wherein the device includes an accelerator.

Statement 114. An embodiment of the disclosure includes the article according to statement 111, wherein the request includes a bias request to switch the bias mode for the first chunk of the data in the storage of the storage device to the device bias mode.

Statement 115. An embodiment of the disclosure includes the article according to statement 111, wherein:
  receiving, at the storage device, the request to access the first chunk of the data in the storage of the storage device includes receiving, at the storage device, the request to access a first page of the data in the storage of the storage device;
  identifying the second chunk of the data in the storage of the storage device includes identifying a second page of the data in the storage of the storage device.

Statement 116. An embodiment of the disclosure includes the article according to statement 115, wherein identifying the second page of the data in the storage of the storage device includes identifying the second page of the data in the storage of the storage device as contiguous with the first page of the data in the storage of the storage device.

Statement 117. An embodiment of the disclosure includes the article according to statement 111, wherein:
  receiving, at the storage device, the request to access the first chunk of the data in the storage of the storage device includes receiving, at the storage device, the request to access a first portion of a region of the data in the storage of the storage device;
  identifying the second chunk of the data in the storage of the storage device includes identifying a second portion of the region of the data in the storage of the storage device.

Statement 118. An embodiment of the disclosure includes the article according to statement 117, wherein identifying the second portion of the region of the data in the storage of the storage device includes identifying the second portion of the region of the data in the storage of the storage device as contiguous with the first portion of the region of the data in the storage of the storage device.

Statement 119. An embodiment of the disclosure includes the article according to statement 111, wherein switching the bias mode for the second chunk of the data in the storage of the storage device to a device bias mode includes switching the bias mode for the second chunk of the data in the storage of the storage device to a device bias mode in expectation of the device accessing the second chunk of the data in the storage of the storage device.

Statement 120. An embodiment of the disclosure includes the article according to statement 111, wherein the device is configured to access the first chunk of the data in the storage of the storage device before second chunk of the data in the storage of the storage device is in the device bias mode.

Statement 121. An embodiment of the disclosure includes the article according to statement 111, wherein switching the bias mode for the second chunk of the data in the storage of the storage device to a device bias mode includes switching the bias mode for the second chunk of the data in the storage of the storage device to a device bias mode as a background operation of the storage device.

Statement 122. An embodiment of the disclosure includes an article, comprising:
  receiving, at a storage device, a request to access a chunk of a data in a storage of the storage device from a host processor; and
  updating an entry in a snoop filter of the storage device for the chunk of the data in the storage of the storage device based at least in part on the request from the host processor.

Statement 123. An embodiment of the disclosure includes the article according to statement 122, wherein the snoop filter is stored in a second storage of the storage device.

Statement 124. An embodiment of the disclosure includes the article according to statement 123, wherein the second storage of the storage device includes a dynamic random access memory (DRAM).

Statement 125. An embodiment of the disclosure includes the article according to statement 123, wherein the second storage includes one of a volatile second storage or a non-volatile second storage.

Statement 126. An embodiment of the disclosure includes the article according to statement 123, wherein:
  the snoop filter includes a first portion and a second portion;
  the second storage of the storage device includes the first portion of the snoop filter; and
  the storage of the storage device includes the second portion of the snoop filter.

Statement 127. An embodiment of the disclosure includes the article according to statement 122, wherein updating the entry in the snoop filter of the storage device for the chunk of the data in the storage of the storage device based at least in part on the request from the host processor includes adding the entry in the snoop filter of the storage device for the chunk of the data in the storage of the storage device based at least in part on the snoop filter not including the entry for the chunk of the data in the storage of the storage device.

Statement 128. An embodiment of the disclosure includes the article according to statement 127, wherein updating the entry in the snoop filter of the storage device for the chunk of the data in the storage of the storage device based at least in part on the request from the host processor further includes switching a bias mode for the chunk of the data in the storage of the storage device to a host bias mode.

Statement 129. An embodiment of the disclosure includes the article according to statement 122, wherein the request includes an identifier that the host processor does not intend to modify the chunk of the data in the storage of the storage device.

Statement 130. An embodiment of the disclosure includes the article according to statement 129, wherein updating the entry in the snoop filter of the storage device for the chunk of the data in the storage of the storage device based at least in part on the request from the host processor includes updating the entry in the snoop filter of the storage of the storage device that the chunk of the data in the storage of the storage device is unmodified by the host processor.

Statement 131. An embodiment of the disclosure includes the article according to statement 122, wherein the request includes an identifier that the host processor intends to modify the chunk of the data in the storage of the storage device.

Statement 132. An embodiment of the disclosure includes the article according to statement 131, wherein updating the entry in the snoop filter of the storage device for the chunk of the data in the storage of the storage device based at least in part on the request from the host processor includes updating the entry in the snoop filter of the storage of the storage device that the chunk of the data in the storage of the storage device is modified by the host processor.

Statement 133. An embodiment of the disclosure includes the article according to statement 122, wherein the non-transitory storage medium has stored thereon further instructions that, when executed by the machine, result in evicting the entry in the snoop filter of the storage device.

Statement 134. An embodiment of the disclosure includes the article according to statement 133, wherein evicting the entry in the snoop filter of the storage device includes evicting the entry in the snoop filter of the storage device based at least in part on an eviction policy of the snoop filter.

Statement 135. An embodiment of the disclosure includes the article according to statement 134, wherein the eviction policy of the snoop filter is different from a second eviction policy of a cache of the host processor.

Statement 136. An embodiment of the disclosure includes the article according to statement 133, wherein evicting the entry in the snoop filter of the storage device includes sending an invalidate request for the chunk of the data in the storage of the storage device form the storage device to the host processor.

Statement 137. An embodiment of the disclosure includes the article according to statement 136, wherein sending the invalidate request for the chunk of the data in the storage of the storage device form the storage device to the host processor includes sending the invalidate request for the chunk of the data in the storage of the storage device form the storage device to the host processor based at least in part on the entry in the snoop filter for the chunk of the data in the storage of the storage device indicating that the chunk of the data in the storage of the storage device is unmodified by the host processor.

Statement 138. An embodiment of the disclosure includes the article according to statement 133, wherein evicting the entry in the snoop filter of the storage device includes sending a back-invalidate request for the chunk of the data in the storage of the storage device form the storage device to the host processor.

Statement 139. An embodiment of the disclosure includes the article according to statement 138, wherein sending the back-invalidate request for the chunk of the data in the storage of the storage device form the storage device to the host processor includes sending the back-invalidate request for the chunk of the data in the storage of the storage device form the storage device to the host processor based at least in part on the entry in the snoop filter for the chunk of the data in the storage of the storage device indicating that the chunk of the data in the storage of the storage device is modified by the host processor.

Statement 140. An embodiment of the disclosure includes the article according to statement 122, wherein the non-transitory storage medium has stored thereon further instructions that, when executed by the machine, result in:

receiving, at the storage device, a block-level protocol request to access the snoop filter; and processing the block-level protocol request, wherein the storage device supports a cache coherent interconnect protocol, the cache coherent interconnect protocol including the block-level protocol and a byte-level protocol.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
   a storage media for a data;
   a controller to manage access to the data in the storage media; and
   a mechanism to store and manage a bias score and a bias mode for a chunk of the data in the storage media based at least in part on the bias score, the bias mode including one of a host bias mode and a device bias mode, the bias score including a multi-bit counter to track access of the chunk of the data in the storage media from a host processor or a device.

2. The storage device according to claim 1, wherein the mechanism to store and manage the bias mode for the chunk of the data in the storage media is configured to issue one of an invalidate request or a back invalidate request to the host processor for the chunk of the data in the storage media based at least in part on the bias mode for the chunk of the data in the storage media being switched to the device bias mode.

3. The storage device according to claim 1, wherein the mechanism to store and manage the bias score and the bias mode for the chunk of the data in the storage media includes the bias score and the bias score for the chunk of the data in the storage media.

4. The storage device according to claim 3, wherein the mechanism to store and manage the bias score and the bias mode for the chunk of the data in the storage media is configured to adjust the bias score for the chunk of the data in the storage media based at least in part on an access of the chunk of the data in the storage media by one of the device or the host processor.

5. The storage device according to claim 3, wherein the mechanism to store and manage the bias score and the bias mode for the chunk of the data in the storage media is configured to change the bias mode for the chunk of the data in the storage media to the host bias mode based at least in part on the bias score reaching a first threshold, and to change the bias mode for the chunk of the data in the storage media to the device bias mode based at least in part on the bias score reaching a second threshold.

6. The storage device according to claim 1, wherein the mechanism to store and manage the bias score and the bias mode for the chunk of the data in the storage media is configured to store and manage the bias score and the bias mode for the chunk of the data in the storage media based at least in part on the device accessing a second chunk of the data in the storage media.

7. The storage device according to claim 6, wherein:
   the second chunk of the data in the storage media includes a first page;
   the chunk of the data in the storage media includes a second page;
   the mechanism to store and manage the bias score and the bias mode for the chunk of the data in the storage media is configured to further store and manage a second bias score and a second bias mode for the second chunk of the data in the storage media; and
   the mechanism to store and manage the bias score and the bias mode for the chunk of the data in the storage media is configured to store and manage bias score and the bias mode for the chunk of the data in the storage media based at least in part on the fact that the second page is contiguous to the first page.

8. The storage device according to claim 1, wherein the mechanism to store and manage the bias score and the bias mode for the chunk of the data in the storage media includes a snoop filter including an entry for the chunk of the data in the storage media as accessed by the host processor, the snoop filter further including a cache controller.

9. The storage device according to claim 8, wherein:
   the entry for the chunk of the data in the storage media identifies that the chunk of the data in the storage media is unmodified by the host processor; and
   the mechanism to store and manage the bias mode for the chunk of the data in the storage media is configured to invalidate the chunk of the data in the storage media from a cache of the host processor based at least in part on the snoop filter evicting the entry for the chunk of the data in the storage media.

10. The storage device according to claim 8, wherein:
    the entry for the chunk of the data in the storage media identifies that the chunk of the data in the storage media is modified by the host processor; and
    the mechanism to store and manage the bias score and the bias mode for the chunk of the data in the storage media is configured to back-invalidate the chunk of the data in the storage media from a cache of the host processor based at least in part on the snoop filter evicting the entry for the chunk of the data in the storage media.

11. The storage device according to claim 1, wherein the multi-bit counter includes at least two bits.

12. A method, comprising:
    receiving, at a storage device, a request to access a chunk of a data in a storage media of the storage device, the request received from a source;
    identifying a bias score for the chunk of the data stored in the storage media of the storage device, the bias score including a multi-bit counter to track access of the chunk of the data in the storage media from a host processor or a device, the storage media of the storage device further storing a bias mode for the chunk of the data, the bias mode based at least in part on the bias score; and adjusting the bias score for the chunk of the data in the storage media of the storage device based at least in part on the source of the request.

13. The method according to claim 12, wherein:

receiving, at the storage device, the request to access the chunk of the data in the storage media of the storage device includes receiving, at the storage device, the request to access the chunk of the data in the storage media of the storage device, the request received from the host processor; and adjusting the bias score for the chunk of the data in the storage media of the storage device based at least in part on the source of the request includes incrementing the bias score for the chunk of the data in the storage media of the storage device based at least in part on the source including the host processor.

14. The method according to claim 13, further comprising switching the bias mode for the chunk of the data in the storage media of the storage device to a host bias mode based at least in part on the bias score crossing a threshold.

15. The method according to claim 12, wherein:

receiving, at the storage device, the request to access the chunk of the data in the storage media of the storage device includes receiving, at the storage device, the request to access the chunk of the data in the storage media of the storage device, the request received from the device; and adjusting the bias score for the chunk of the data in the storage media of the storage device based at least in part on the source of the request includes decrementing the bias score for the chunk of the data in the storage media of the storage device based at least in part on the source including the device.

16. The method according to claim 15, further comprising switching the bias mode for the chunk of the data in the storage media of the storage device to a device bias mode based at least in part on the bias score crossing a threshold.

* * * * *